(12) United States Patent
Yamada et al.

(10) Patent No.: US 7,464,970 B2
(45) Date of Patent: Dec. 16, 2008

(54) PIPE JOINT

(75) Inventors: Yuji Yamada, Nagoya (JP); Shigeo Oi, Kariya (JP); Naohito Nonoyama, Aichi-gun (JP)

(73) Assignee: Togo Seisakusyo Corporation, Aichi (JP)

( * ) Notice: Subject to any disclaimer, the term of this patent is extended or adjusted under 35 U.S.C. 154(b) by 0 days.

(21) Appl. No.: 10/969,865

(22) Filed: Oct. 22, 2004

(65) Prior Publication Data
US 2005/0087981 A1    Apr. 28, 2005

(30) Foreign Application Priority Data
Oct. 22, 2003    (JP)    ............................ 2003-362406
Aug. 6, 2004    (JP)    ............................ 2004-231396

(51) Int. Cl.
*F16D 37/00*    (2006.01)

(52) U.S. Cl. ...................... 285/305; 285/319

(58) Field of Classification Search ................. 285/305, 285/319, 308
See application file for complete search history.

(56) References Cited
U.S. PATENT DOCUMENTS

| | | | |
|---|---|---|---|
| 2,265,268 A | 12/1941 | Culligan | |
| 5,542,716 A | 8/1996 | Szabo et al. | |
| 5,730,481 A | 3/1998 | Szabo et al. | |
| 5,765,877 A * | 6/1998 | Sakane et al. | ................. 285/93 |
| 5,951,063 A | 9/1999 | Szabo | |
| 2002/0084652 A1 * | 7/2002 | Halbrock et al. | ............ 285/305 |
| 2003/0090109 A1 | 5/2003 | Ostrander et al. | |
| 2004/0075274 A1 * | 4/2004 | Szabo et al. | ................. 285/305 |

FOREIGN PATENT DOCUMENTS

| | | |
|---|---|---|
| EP | 1323972 A2 | 7/2003 |
| JP | 10/509232 | 9/1998 |
| WO | 96/14535 | 5/1996 |

* cited by examiner

*Primary Examiner*—Aaron M Dunwoody
(74) *Attorney, Agent, or Firm*—Wenderoth, Lind & Ponack, L.L.P.

(57) ABSTRACT

A pipe joint for connecting a rigid pipe with a retaining flange to a tube includes a pipe joint body formed with a through bore and a window in communication with the bore. A tube connector portion may be connected at an angle to a rigid pipe connector portion. A pipe retainer provided with locking pieces can be located in two positions relative to the pipe joint body. The first position allows the retaining flange to pass through the locking pieces. The second position retains the rear of the retaining flange and prevents inadvertent removal of the rigid pipe. The retaining pieces engage the rear of the flange through the window communicating with the bore. The locking direction of the retainer can be altered relative to the tube connector portion to suit different applications and ease assembly.

18 Claims, 39 Drawing Sheets

PIPE JOINT

BACKGROUND OF THE INVENTION

1. Field of the Invention

This invention relates to a pipe joint for connecting a rigid pipe to a flexible tube, for example, as used in automobiles.

2. Description of the Related Art

Pipe joints have been known as means for connecting a rigid fuel pipe (typically a metal fuel pipe or resin tube) to a flexible tube where each component has a relatively small diameter. The pipe joint may be used for example in the fuel supply system of an automobile. JP-A-10-509232 discloses one of these types of pipe joints. In the disclosed pipe joint, a tube connector (a male connector) is fitted to a pipe joint body (a female connector) to which a rigid (metal or resin for example) pipe is connectable. A retainer further fixes or locks the fitted rigid pipe to prevent inadvertent or unintentional removal of the rigid pipe. The pipe joint body has a bore into which the rigid pipe is inserted. A side hole is formed in an outer face of the pipe joint body so as to communicate with the bore. The retainer is mounted in the side hole. The retainer includes a pair of legs capable of locking the rigid pipe. The retainer is displaceable between a preliminary lock position, where the rigid pipe can be assembled and disassembled and a lock position where the rigid pipe is fixed to the pipe joint.

The pipe joint takes a linear shape when the flexible tubing and the rigid pipe, extend in the same direction or in other words, when an axis of the flexible tubing is coincident with the axis of the rigid pipe. On the other hand, when the axis of the flexible tube is at an angle to the axis of the rigid pipe, the pipe joint needs to be bent into an L-shape or the like according to the corresponding directions in which the flexible tubing and the rigid pipe extend. In this case, the direction in which the retainer is operated from the preliminary lock position to the lock position depends upon the location of the side hole formed in the pipe joint body.

However, the direction in which the piping extends and a peripheral space (a space used to operate the retainer) differ from one application to another, or for example, from one type of automobile to another. Accordingly, when a single type of pipe joint is used in a plurality of applications, there often arises a case where a space for operating (i.e., thrusting the retainer into the locked position) the retainer cannot be ensured. In this case, the location of the side hole formed in the pipe joint needs to be changed so that the retainer operating direction is shifted. Consequently, a pipe joint body dedicated to the above application use is required. It is possible to require as many different types of pipe joints as there are applications. This illustrates the problem that the conventional pipe joint lacks the ability of being a general-purpose item. As a result, there is a need for improvement in the design of the conventional pipe joint.

SUMMARY OF THE INVENTION

Therefore, an object of the present invention is to provide a pipe joint that has an adjustable relationship between the extension direction of the flexible tubing and the operating direction of the retainer.

The present invention provides a pipe joint into which a rigid pipe is inserted to be connected thereto. The rigid pipe has a distal end formed with a retaining flange. The pipe joint includes a pipe joint body formed with a bore extending axially and having one open end through which the rigid pipe is inserted into the bore and the other end to which a tube is adapted to be connected. The pipe joint body further includes a window in communication with the bore, and a pipe retainer provided with a locking piece extending through the window. The locking piece advances into and out of the bore (a first position and second position) when the retainer is moved relative to the pipe joint body in a direction perpendicular to the insertion direction of the rigid pipe into the bore. The locking piece allows the retaining flange to pass therethrough when the locking piece is in the second position. When the locking piece is in the first position, the locking piece engages the rear of the flange to thereby limit or restrict movement of the rigid pipe in a disconnecting direction. First and second connectors co-axially butted against each other thereby constitute the pipe joint body and characterize the pipe joint. The first connector is for connecting the tubing. The second connector is for connecting the rigid pipe. Either one of the first and second connectors may have a butted portion provided with a support; the other connector may have a butted portion provided with a guide receiving the support perpendicularly to the connection direction of the rigid pipe. A plurality of sliding surfaces may be formed so as to extend peripherally on an outer face of the support. The butted portions of the first and second connectors may be circumferentially shifted so that the guide selectively receives the sliding surfaces.

In the above-described construction, since a plurality of the sliding surfaces is formed so as to extend peripherally about an outer face of the support, the selection of a plurality of fitting positions between the support and the guide is possible. Accordingly, the mounting angle of the retainer to the relative to the pipe joint can be adjusted by changing the fitting position of the support. More specifically, since a direction of operation of the retainer can be selected irrespective of the direction of extension of the tubing connector, the retainer can be mounted without having to use a forced or difficult assembly position, improving the assembly efficiency.

The present invention further provides a pipe joint into which a rigid pipe, including a retaining flange that is formed at a distal end thereof, can be inserted and connected. The pipe joint has a pipe joint body that is formed with a bore extending axially therethrough. The pipe joint body includes a first end through which the rigid pipe is insertable into the bore along an insertion direction of the rigid pipe, a second end that is adapted to be connected to a flexible tube, a retaining window located in a retainer attachment face in communication with the bore, a first engagement window in communication with the bore and located in the first side of the pipe joint body approximately 90° clockwise away from the retainer attachment face around a center axis of the bore from a view of the pipe joint body along the insertion direction of the rigid pipe, a first guide recess located on the first side of the pipe joint body, a second engagement window in communication with the bore and located in a second side of the pipe joint body approximately 90° counterclockwise away from the retainer attachment face around a center axis of the bore from the view of the pipe joint body along the insertion direction of the rigid pipe and a second guide recess located on the second side of the pipe joint body. A pipe retainer includes a base, a locking piece extending from the base and inserted through the retaining window, and a pair of engagement arms the extend from the base along the first and second sides of the pipe joint body in the same direction as the locking piece. Each engagement arm comprises a distal engagement claw inserted through a corresponding first side engagement window or a second side engagement window. The distal engagement claws are able to temporarily fix the pipe retainer in a preliminary lock position by engaging with the corresponding first side engagement window and the second side engagement window so that the pipe retainer is prevented from movement toward a final lock position, thereby holding the pipe retainer at the preliminary lock position, and a pair of position holding arms extending from the base along the first and second sides of the pipe joint body in the same direction as the locking piece. Each of the pair of position holding arms slidably engages the corresponding first guide recess or second guide recess. Further, when the rigid pipe is fully inserted into the bore, the retaining flange of the rigid pipe presses the engagement claws so that the engagement claws are spread outward, thereby releasing the pipe retainer from the preliminary lock position and allowing the retainer to move to the final lock position. The locking piece interacts with the retaining flange to inhibit removal of the rigid pipe when the retainer is in the final lock position.

BRIEF DESCRIPTION OF THE DRAWINGS

Other objects, features and advantages of the present invention will come clear upon understanding of the following description of the embodiments with reference to the accompanying drawings in which.

DETAILED DESCRIPTION OF THE INVENTION

Figure 1:
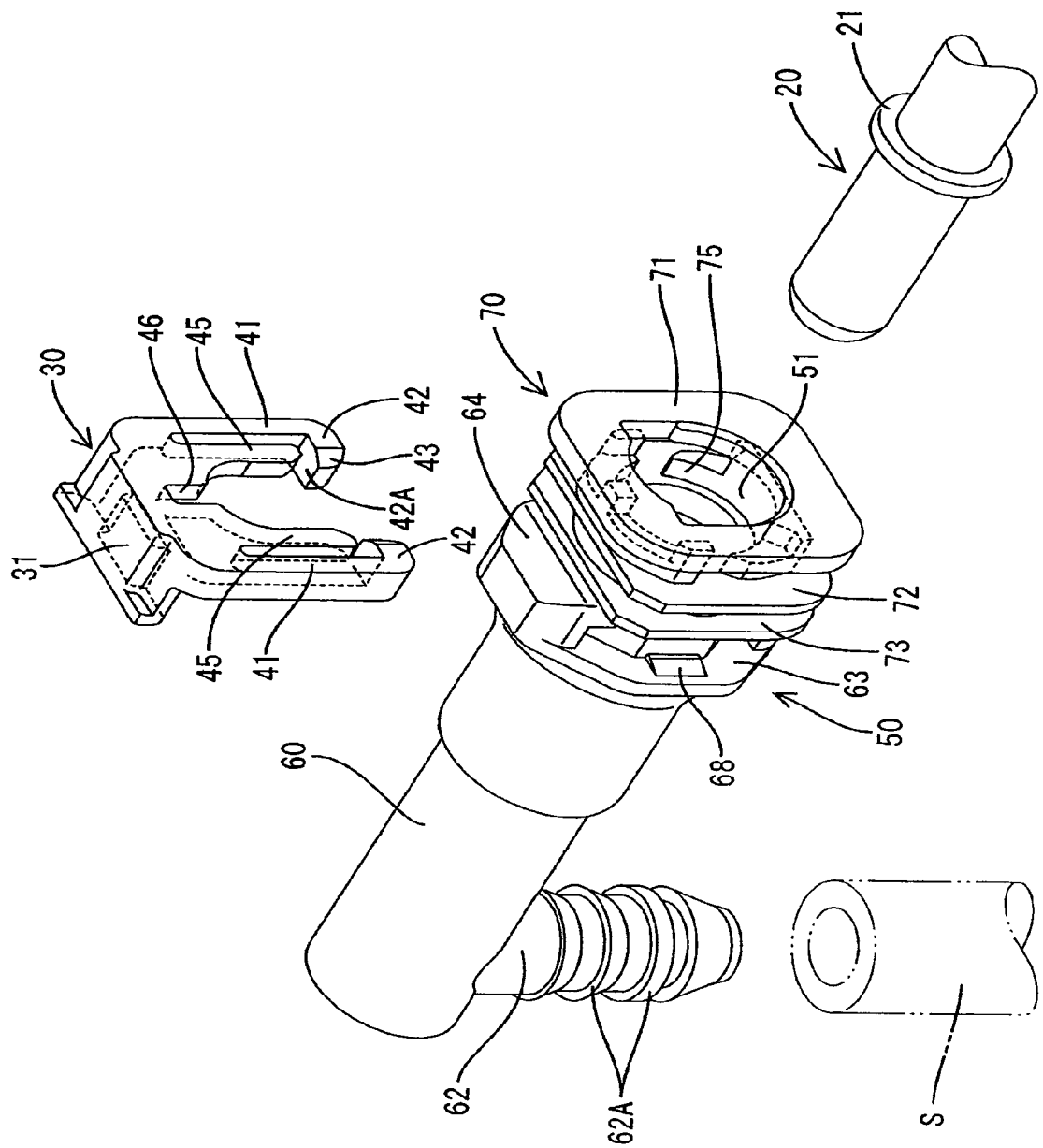
FIG. 1 is an exploded perspective view of a pipe joint in accordance with one embodiment of the present invention.

Several embodiments of the present invention will be described. FIGS. 1 to 16 illustrates the pipe joint of a first embodiment. Referring to FIG. 1, a rigid pipe 20 is made of a synthetic resin or a metal for example. A retaining flange 21 is formed on a distal end of the rigid pipe 20 so as to extend about the entire periphery of the rigid pipe 20. A pipe joint body 50 is divided into front and rear components as will be described later. The front component is a tube connector 60 serving as a first piping connector in the invention. The second component is a rigid pipe connector 70 serving as the second piping connector. A flexible tube S is adapted to be connected to the tube connector 60. A retainer 30 and the rigid pipe 20 are adapted to be connected to the rigid pipe connector 70. In FIG. 1, the left side is the front and the right side is the rear.

The pipe joint body 50 includes a tube-fitting portion 62 formed on an end of a cylindrical portion and bent at some angle downward (in this embodiment, the angle is 90° to the rigid pipe connector 70). The tube-fitting portion 62 has a plurality of annular engaging protrusions 62A formed on an outer periphery thereof so as to extend along part of the axial length of the tube-fitting portion 62. A tube S, made from a synthetic resin, is fitted to the engaging protrusions 62A to retain and seal the tube S to the tube-fitting portion 62. Furthermore, the body 50 has an insertion aperture 51 formed in the body 50 so as to extend in an axial direction of the rigid pipe connector 70. The rigid pipe 20 is inserted through the insertion aperture 51.

Figure 3:
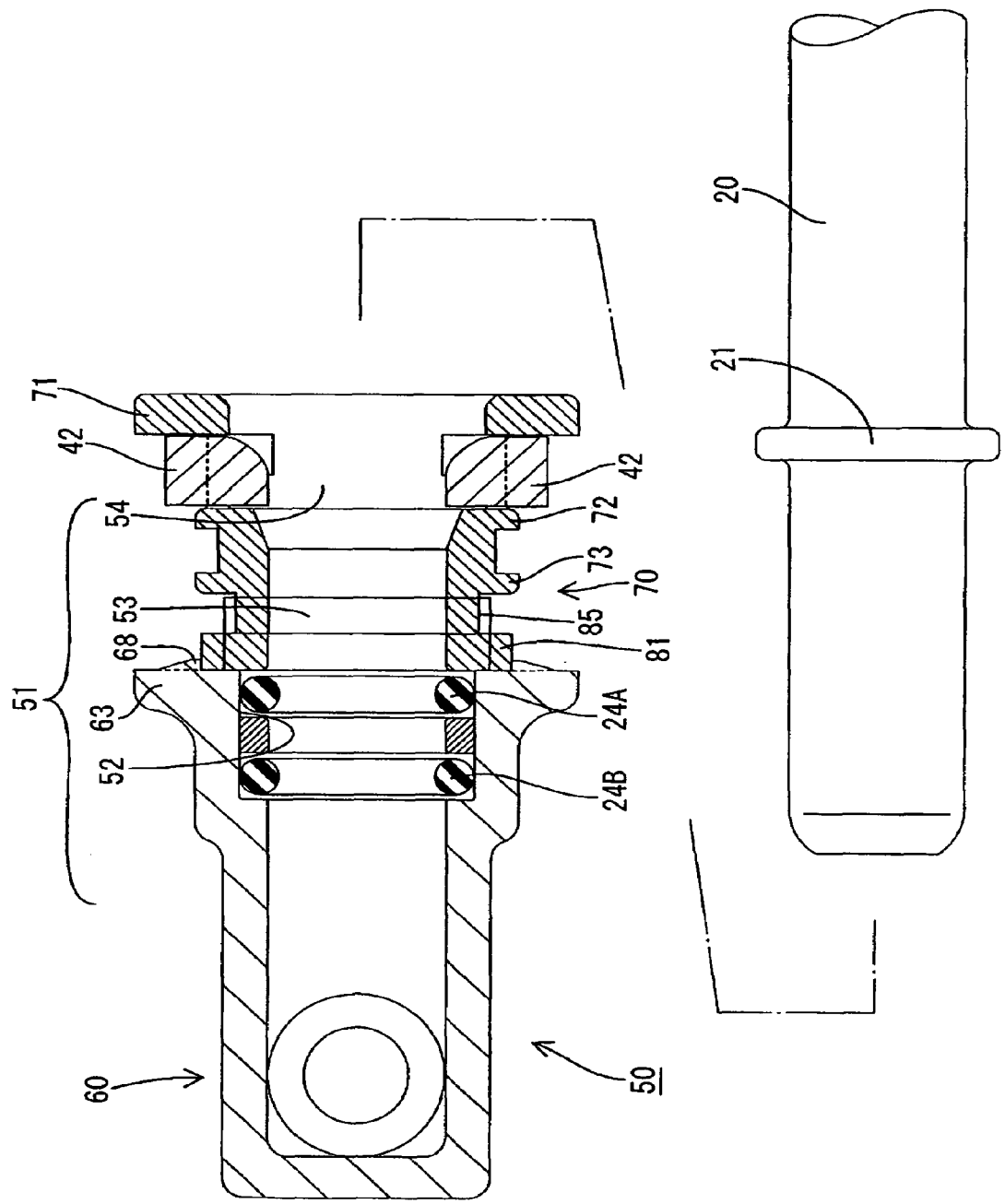
FIG. 3 is a vertical section of the pipe joint before insertion of the pipe.

A middle portion 52 is formed between the ends of the insertion aperture 51 as shown in FIG. 3. The middle portion 52 is formed into a step-like shape. Two seal rings 24A and 24B, each serving as a sealing portion, are fitted to the middle portion 52. Both seal rings 24A and 24B are designed to adhere close to the outer periphery of the rigid pipe 20. In the assembled state, seal rings 24A and 24B seal a gap between the exterior surface of the rigid pipe 20 and the interior wall of the insertion aperture 51. Furthermore, a smaller-diameter portion 53 and an insertion portion 54 are provided between the middle portion 52 and the pipe entrance (i.e., the rear edge of the body 50, to the right in FIG. 3). The inner diameter of the insertion portion 54 is larger than the inner diameter of the middle portion 52 and substantially as large as the outer circumference of the retaining flange 21. The smaller-diameter portion 53 will be described later.

The body 50 has a rear end (i.e., right end as viewed in FIG. 3) formed with a peripherally protruding flange 71. The flange 71 is substantially square in shape. The body 50 further has two peripherally protruding edges, 72 and 73, which are located to the front of the flange 71 but in the rear of the body 50. Protruding edges 72 and 73 are also substantially square in shape. A portion of the body 50 between the forward protruding edge 72 and the flange 71 serves as a mounting portion 74. A retainer 30, as will be described, is designed to be mounted on the mounting portion 74. The mounting portion 74, is cylindrical in shape and has an upper side including an opening proximate to the flange 71 (see FIG. 15). The opening serves as a window 77 communicating with the interior of the insertion aperture 51. The retainer 30 includes two locking pieces 45, each of which is adapted to enter and exit the insertion aperture 51 through the window 77. Furthermore, a rib 74A is provided on the central window 77 to reinforce the stiffness of the mounting portion 74.

Figure 8:
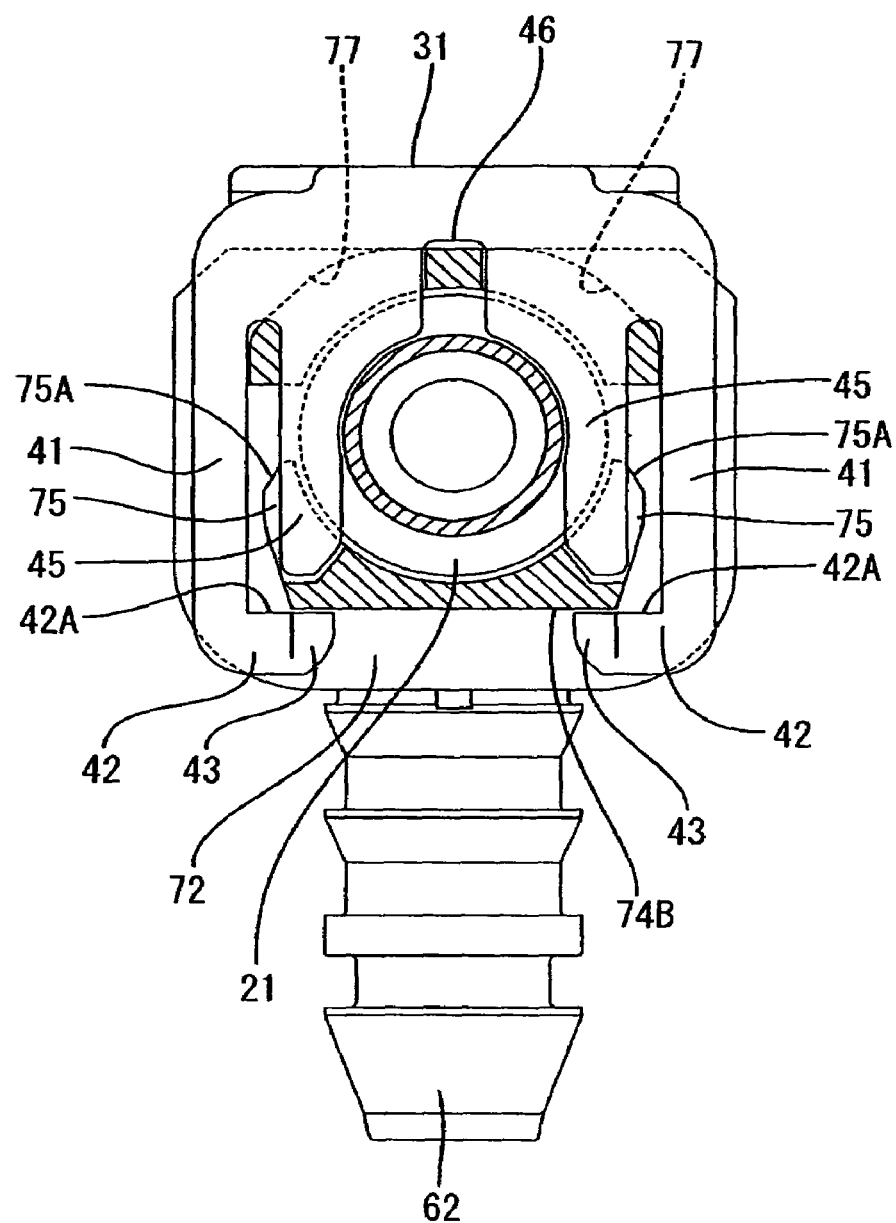
FIG. 8 is a vertical section of the pipe joint under the condition where the pipe retainer has been thrust into the lock position.

The retainer 30 may be made from a synthetic resin and has a plate-shaped base 31. The retainer 30 further has two engagement arms 41 extending downward from the rear edge of the retainer 30 (see FIG.2) and also the two downwardly extending locking pieces 45. The retainer 30 is engageable with the pipe joint body 50 at a preliminary engagement location (e.g., a first position) as shown in FIG. 6 and a lock position (e.g., a second position) as shown in FIG. 8.

Both engagement arms 41 are disposed to the outside of the base 31. Conversely, the locking pieces 45 are respectively disposed to the inside of the engagement arms 41. Each locking piece 45 is formed so as to have such a width that enables each locking piece 45 to be inserted into the window 77. Each locking piece 45 has a proximal end with an arc shaped inner peripheral side. Consequently, the proximal end side of each locking piece 45 has a higher stiffness than the distal end portion so that the proximal end is relatively inflexible. However, each engagement arm 41 has a larger amount of downward protrusion than each locking piece 45. Each engagement arm 41 also has a substantially constant width over its entire length and is therefore elastically displaceable. A slit 46 is defined between the locking pieces 45 and extends straight towards the base 31. The slit 46 serves as clearance for a rib 74A.

Figure 6:
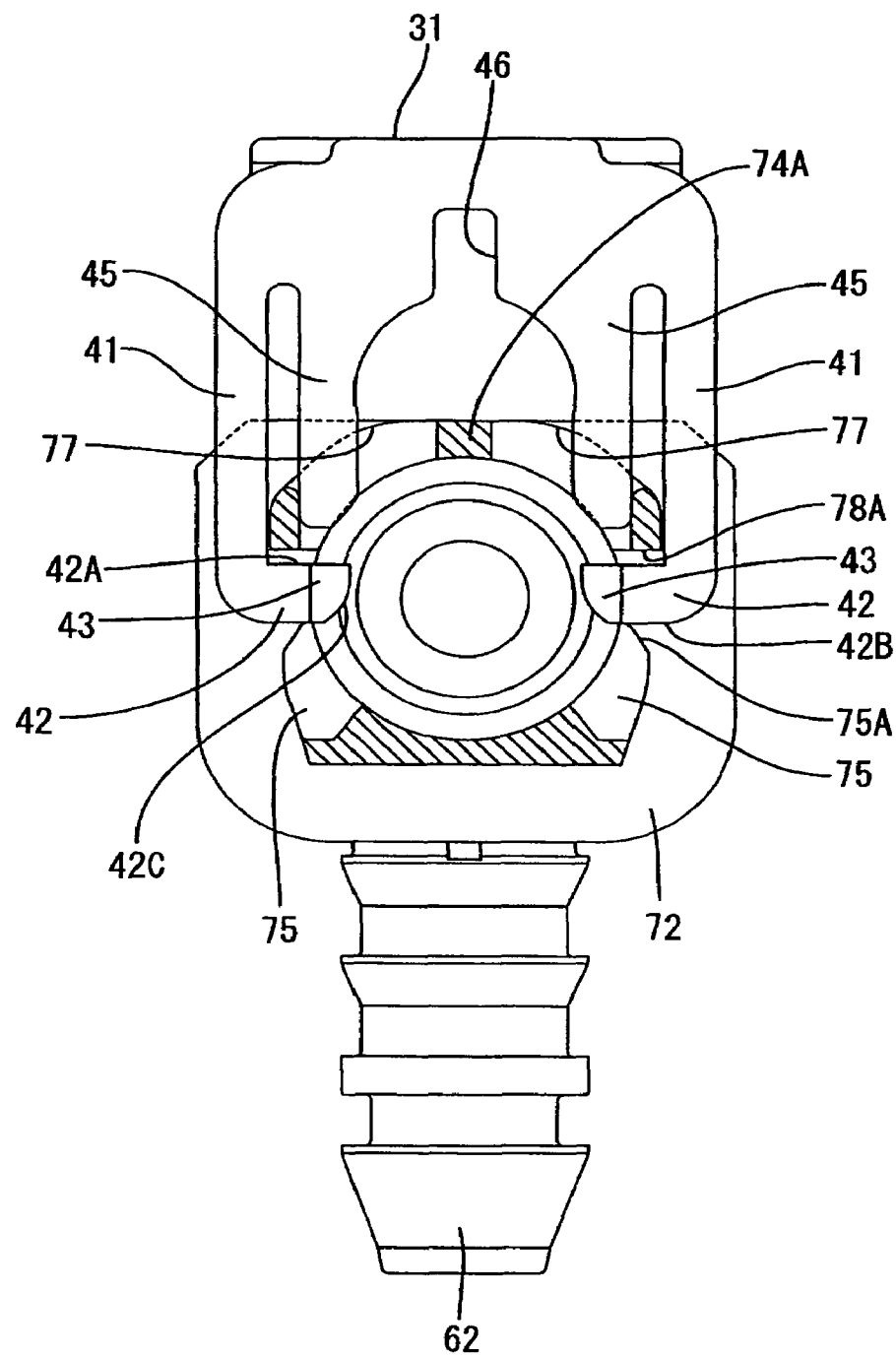
FIG. 6 is a vertical section of the pipe joint under the condition where the pipe retainer is at a preliminary engagement position as seen along line A-A in FIG. 2.

Each engagement arm 41 has a distal end that is formed into an inwardly directed engagement claw 42 (see FIG. 6). Each engagement claw 42 has a top that is flat over its entire length from the proximal end to the distal end. The flat top of each engagement claw 42 serves as an upper lock surface 42A. Furthermore, each engagement claw 42 has an underside including a proximal end side flat lower lock surface 42B. The underside of each engagement claw 42 further includes a tapered distal end side provided with an arc shaped guide 42C.

Figure 2:
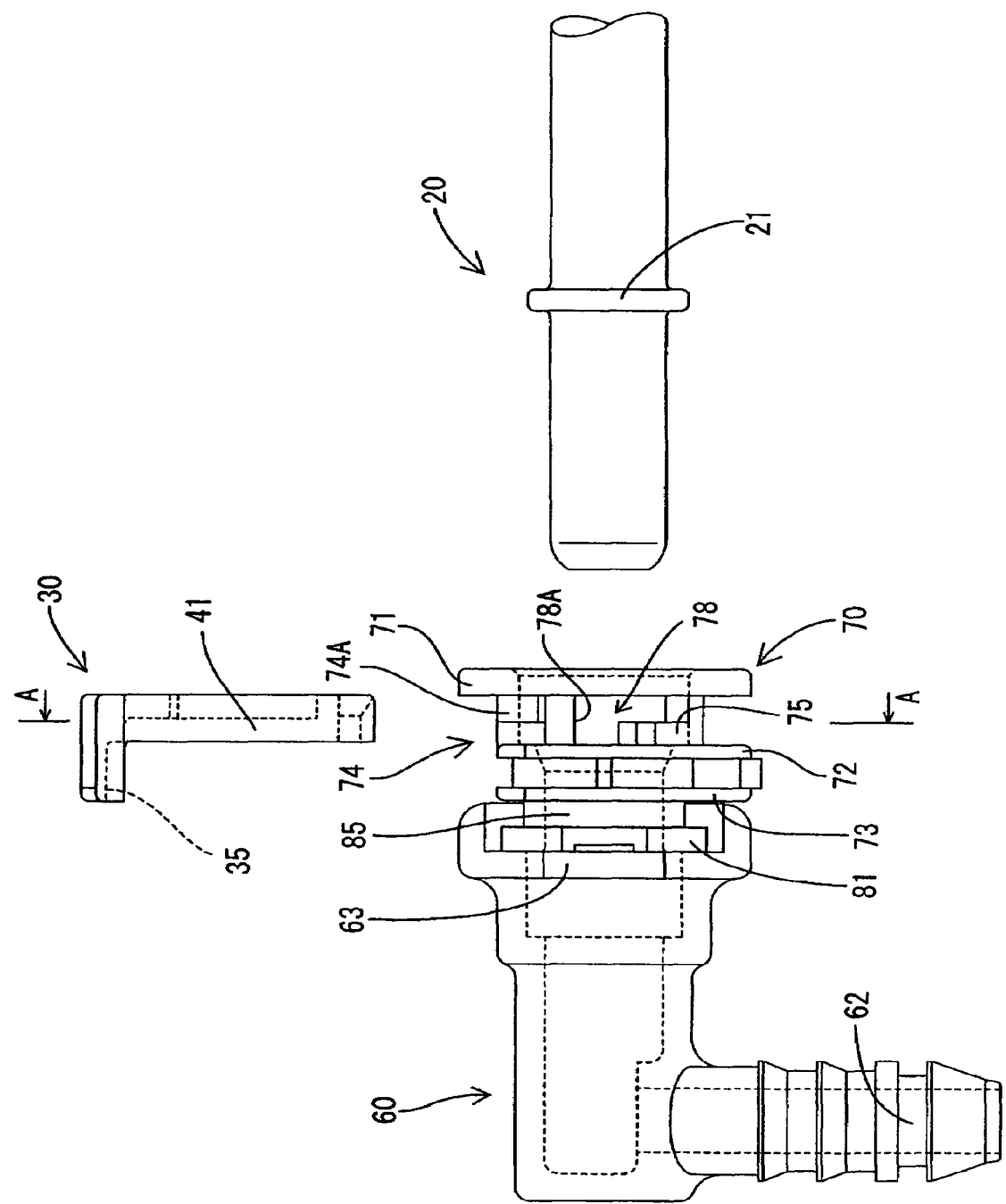
FIG. 2 is a side view of a pipe, pipe joint body and retainer.

Two lock holes 78 are defined on the left and right sides of the mounting portion 74 (see FIG.2). The lock holes 78 are located approximately midway with respect to the height of the mounting portion 74. The lock holes 78 communicate with the insertion aperture 51. A ceiling 78A of the each lock hole 78 includes a flange 71 side and a protrusion 72 side. Both the flange 71 side and the protrusion 72 side of each lock hole 78 have the same height. Conversely, the bottom of each lock hole 78 includes a lower edge at the flange 71 side that is set to extend lower than the lower edge at the protrusion 72 side. The lower edges of each lock hole 78 form a stepped portion 75.

When each engagement claw 42 is inserted into the corresponding lock hole 78, the upper lock face 42A of the engagement claw 42 engages the ceiling 78A of each lock hole 78 to limit movement of the retainer 30 in an unlocking direction, as shown in FIG. 6. Furthermore, the lower lock face 42B of each engagement claw 42 engages the stepped portion 75 of each lock hole 78 to limit the movement of the retainer 30 in a locking direction. As a result, the retainer 30 is temporarily locked at a preliminary lock position as shown in FIG. 6.

When the retainer 30 is locked in the preliminary lock position, the base 31 is located apart from the outer periphery of the pipe retainer body 50 by a predetermined height. In addition, a part of each locking piece 45 is inserted into the window 77 but without interfering with the guide aperture 51. Accordingly, the rigid pipe 20 can be inserted into and removed from the guide aperture 51.

Figure 4:
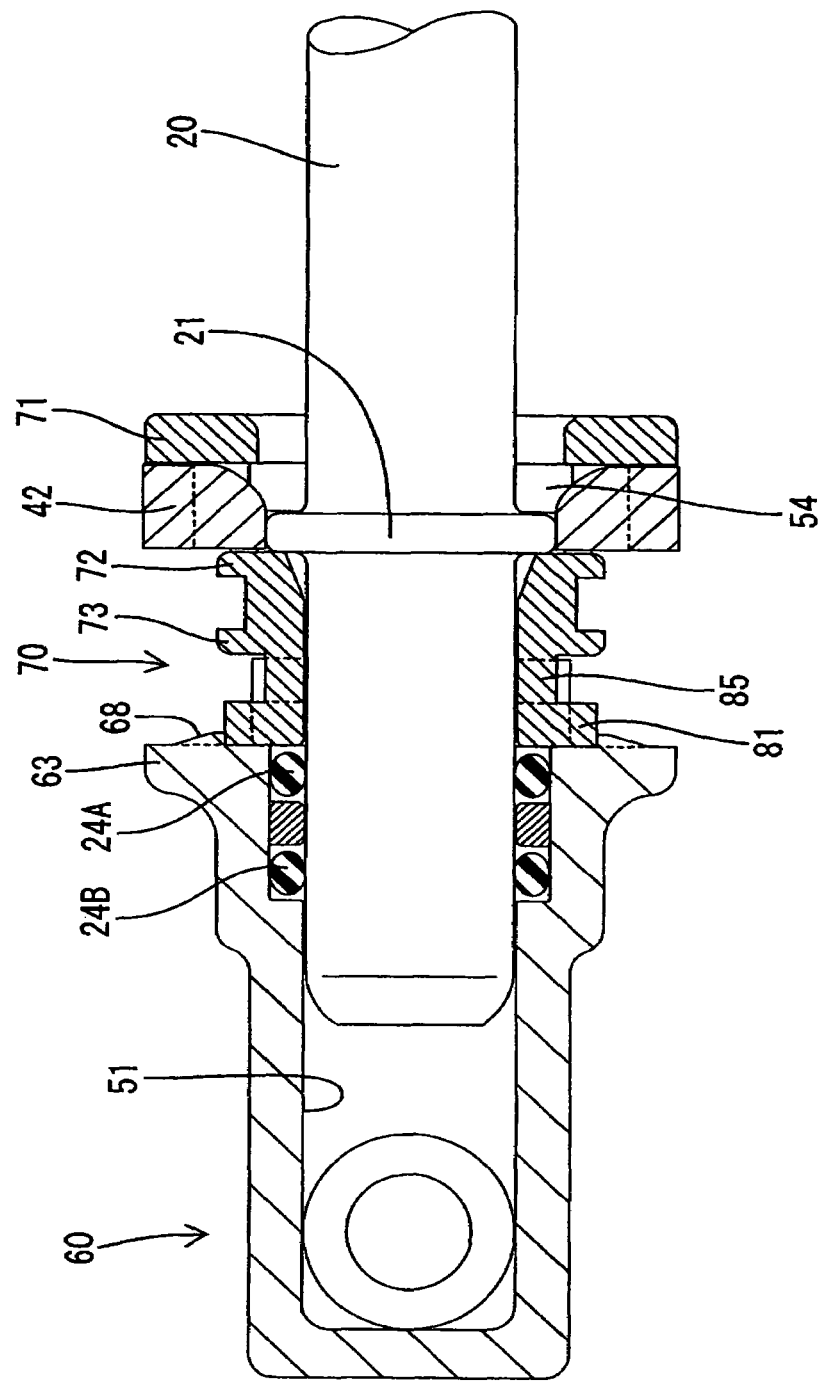
FIG. 4 is a vertical section of the pipe joint in a case where the pipe is at a normal insertion position.
Figure 5:
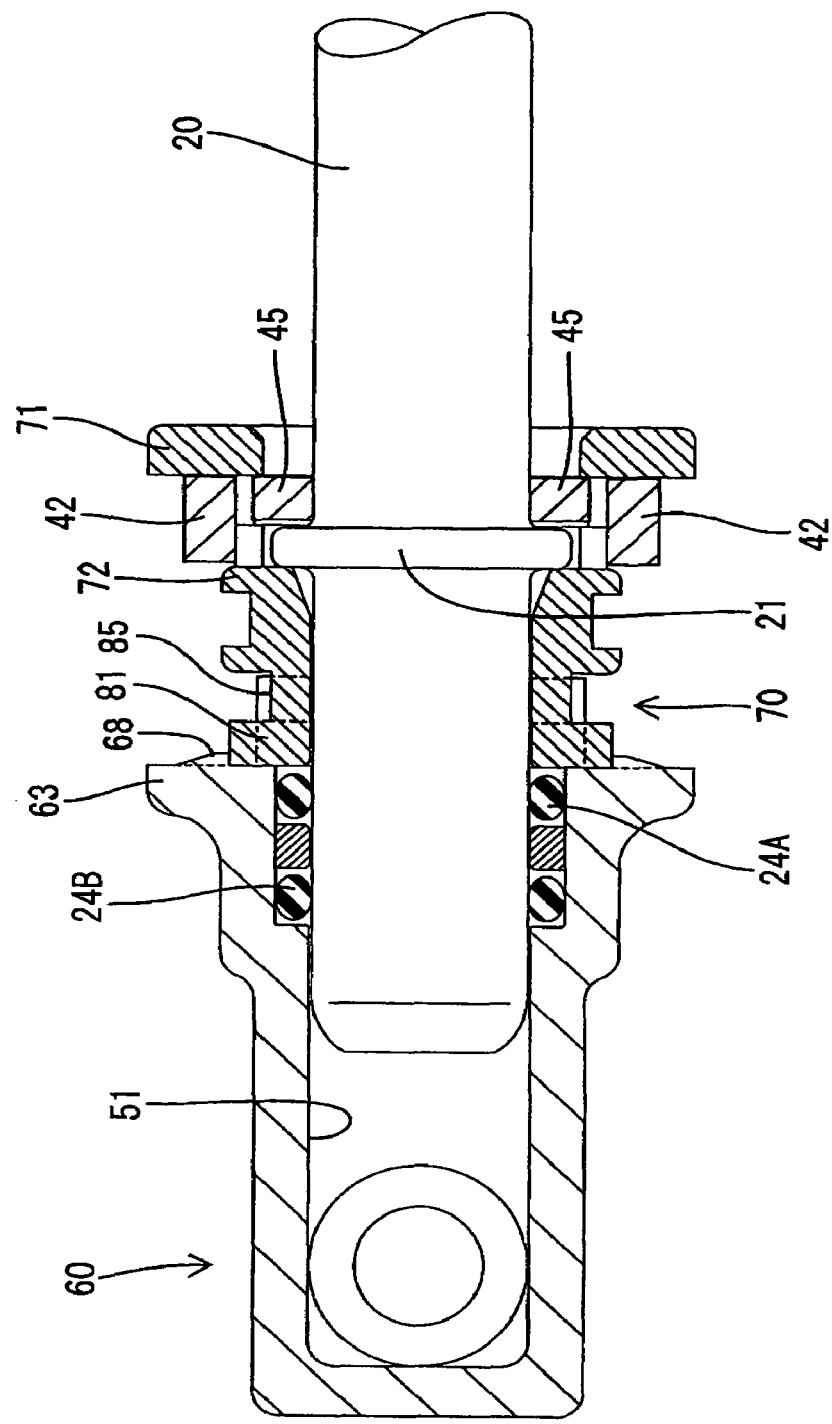
FIG. 5 is a vertical section of the pipe joint in the condition where the pipe retainer is in engagement with a fall-off preventing flange.

The following describes a structure for releasing each engagement claw 42 from preliminary engagement with each corresponding lock hole 78. Each engagement claw 42 includes a forward side relative to the insertion direction of the rigid pipe 20. The forward side of each engagement claw 42 is formed with an inwardly and downwardly inclined guide face 43. Furthermore, when the retainer 30 is locked at the preliminary lock position, the distal end of each engagement claw 42 is located within the insertion aperture 51 (see FIG. 6). Each engagement claw 42 is positioned so as to interface with the retaining flange 21 when the rigid pipe 20 is inserted into the rigid pipe connector 70. When the retaining flange 21 reaches a predetermined depth or a position where the front of the retaining flange 21 is in abutment with the end face of the insertion portion 54, as shown in FIG. 4, the retaining flange 21 spreads out or forces apart the engagement claws 42 in a radially outward direction (see FIG. 7).

Figure 7:
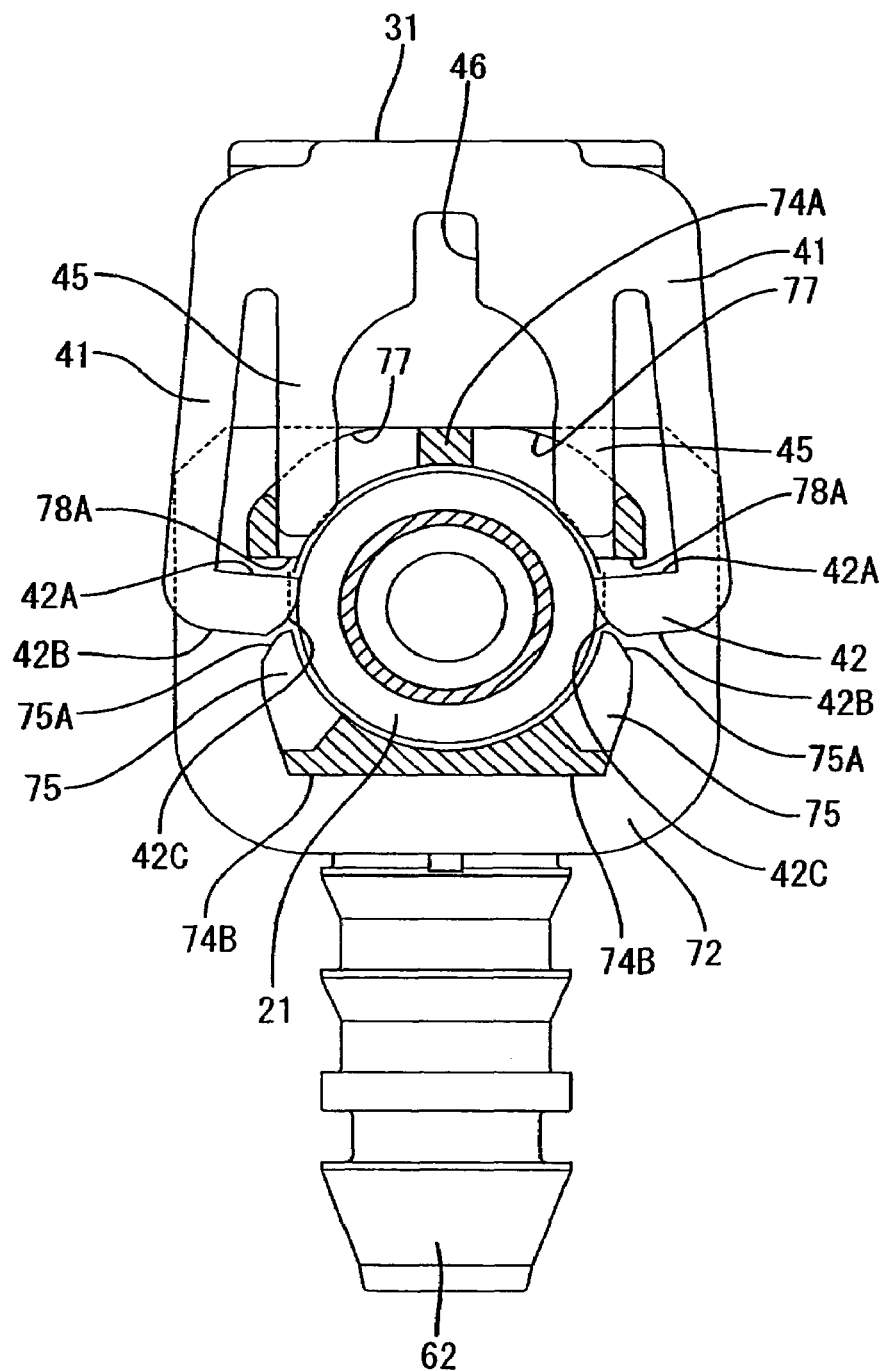
FIG. 7 is a vertical section of the pipe joint under the condition where the pipe retainer has been inserted into the normal insertion position.

Consequently, the lower side lock face 42B of each engagement claw 42 is released from engagement with the stepped portion 75, as shown in FIG. 7. Under the released condition, the guide portion 42C of each claw 42 confronts the upper portion of the stepped portion 75. The upper stepped portion is provided with a tapered section 75A having such an inclination such that the upper stepped portion is upwardly tapered as viewed in FIG. 7. Accordingly, when a force is applied in locking direction of the retainer 30 in the above state, the guide portion 42C and the tapered portion 75A further spread the engagement arms 41 of the retainer 30. As a result, the retainer 30 is completely released from the preliminary locked position, whereupon the retainer 30 is further displaceable downward in the locking direction.

The mounting portion 74 has a flat underside that includes left and right edges serving as locking seats 74B. The upper lock face 42A of each engagement claw 42 engages the corresponding locking seat 74B when the retainer 30 is located at the final lock position. The final lock position is where the locking pieces 45 engage the retaining flange 21. Consequently, the rigid pipe 20 is prevented from removal by the retainer 30 (see FIG. 8). Furthermore, when the retainer 30 is located at the final lock position, the underside of the base 31 is designed to substantially abut against the upper end faces of the protruding edges 72 and 73. The base 31 has an underside provided with a releasing depression 35 for releasing the retainer 30 from the final locked state. As a result, a slight gap is defined between the underside of the base 31 and the upper ends of the protruding edges 72 and 73. A releasing jig (not shown) is insertable through the gap into the releasing depression 35. A predetermined releasing operation is carried out so that the engagement claws 42 are disengaged from the locking seats 74B.

Figure 9:
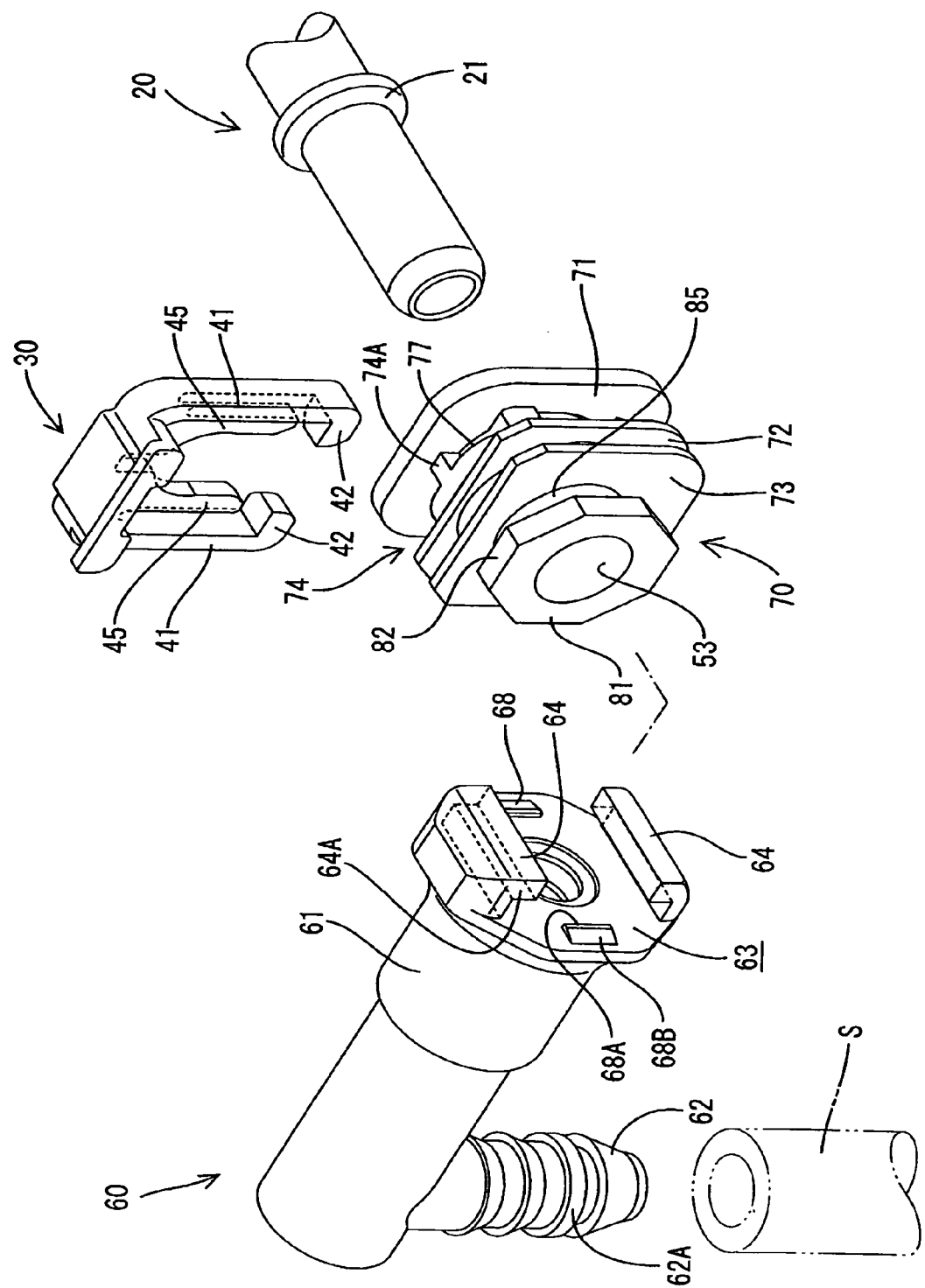
FIG. 9 is an exploded perspective view of the pipe joint body, retainer and pipe.
Figure 10:
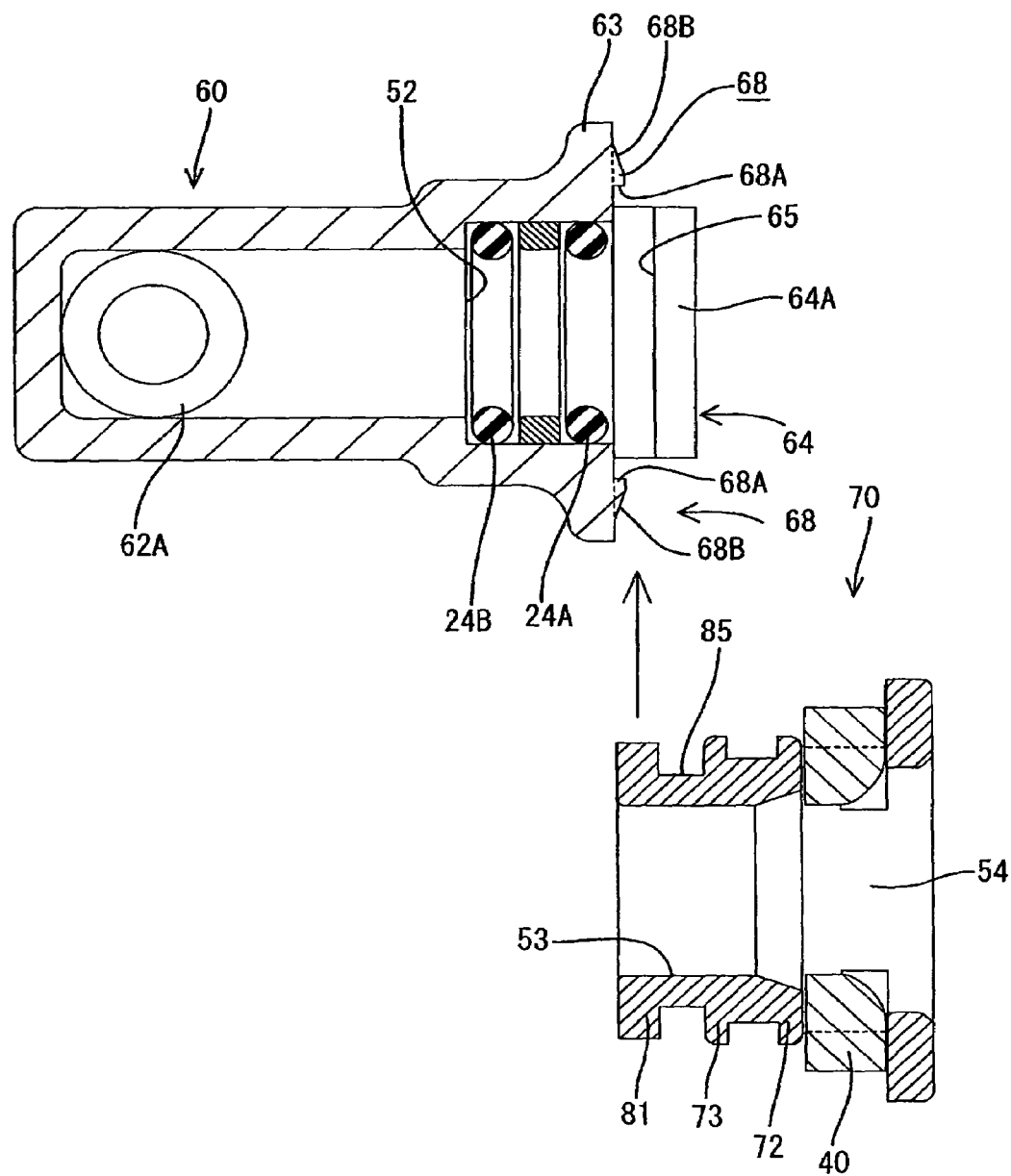
FIG. 10 is a sectional view showing assembly of the pipe connector to the tube connector.
Figure 12:
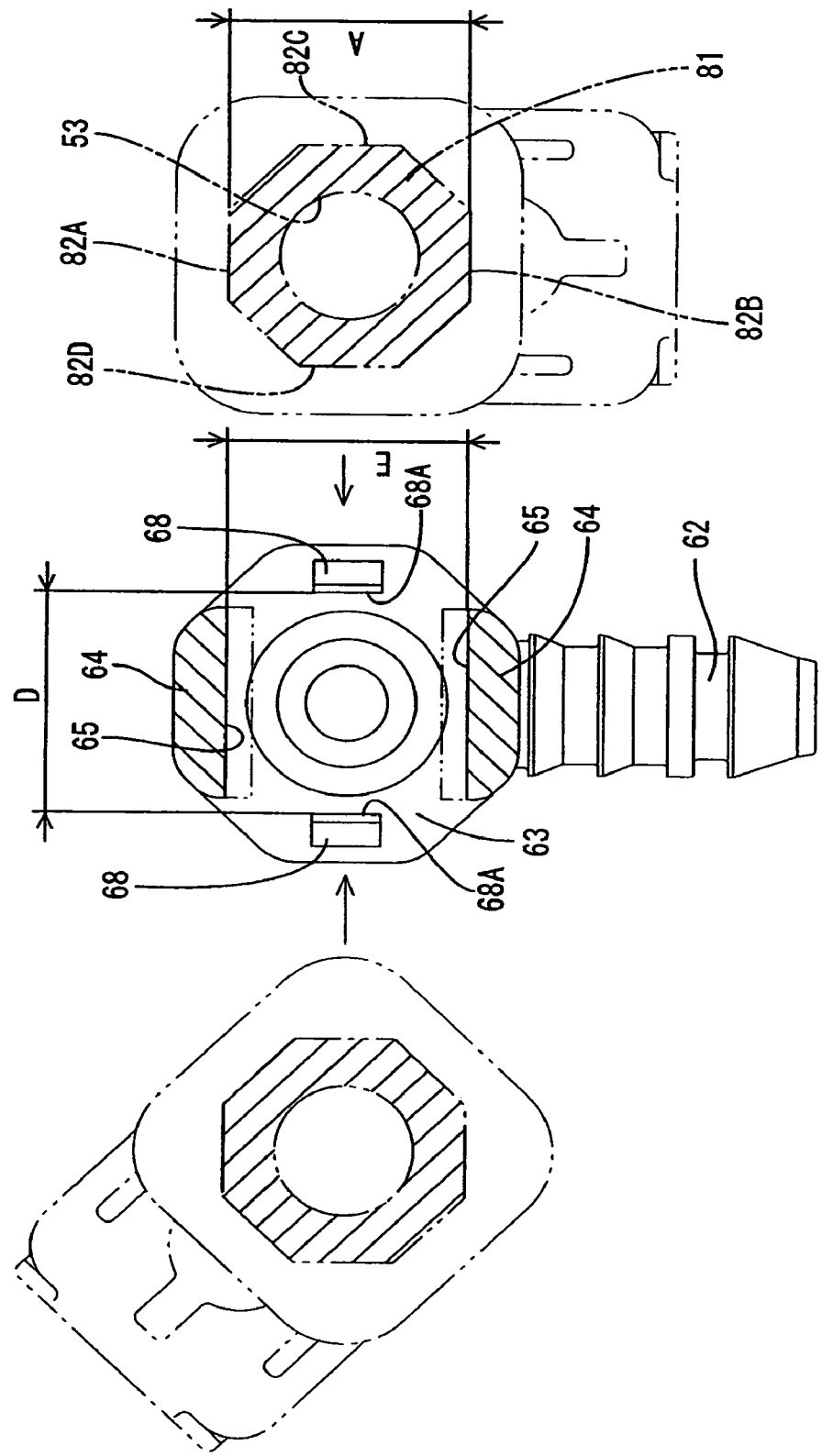
FIG. 12 is a sectional view showing an example of the position of the pipe connector assembled to the tube connector.

A connecting structure of the tube connector 60 and the rigid pipe connectors 70 will now be described. Referring to FIG. 9, a flat support plate 81, serving as a support in the current invention, is provided to the front of the protruding edge 73 of the rigid pipe connector 70. A cylindrical stepped clearance portion 85 is provided to connect the support plate 81 to the protruding edge 73. The support plate 81 may be formed into a regular octagon and is coaxial with the rigid pipe connector 70. Each of eight sides of the support plate 81 serves as a sliding contact face 82 which can be brought into sliding contact with the groove 65, serving as a guide. Each pair of opposed sides has an equal distance between them, i.e., dimension A as shown in FIG. 12. The stepped clearance portion 85 is provided for clearing a counter component (guide wall 64) when the connectors 60 and 70 are assembled together.

The tube connector 60 has an octagonal mounting seat 63 provided on the rear thereof. The mounting seat 63 has a fit face or a face for directly abutting the pipe connector 70. The mounting seat 63 includes a pair of guide walls 64 and a pair of locking protrusions 68 formed on the fit face surface. For example, in this embodiment two guide walls 64 are provided along upper and lower sides (as viewed in FIG. 9) perpendicular to the direction in which the tube-fitting portion 62 extends. Each guide wall 64 has a generally L-shaped cross sectional area. An exterior guide wall 64A extends perpendicular to the fit face surface of the mounting seat 63. The upper and lower guide walls 64 oppose each other across the fit face and are symmetric with each other about the axis of the tube connector 60. Each guide wall 64 includes an inner wall defining a groove 65. A distance (dimension E in FIG. 12) between the groove walls of the upper and lower grooves 65 is set to be substantially equal to the dimension A. Each groove 65 has a width (distance between the fit face of the mounting seat 63 and the exterior guide wall 64A) slightly larger than the thickness of a support plate 81. As a result, when the support plate 81 is inserted through an opening side into the space defined by the upper and lower grooves 65, a sliding contact face 82 of the support plate 81 is brought into sliding contact with a corresponding inner wall of the groove 65, so that connectors 60 and 70 are guided in the assembly operation. Furthermore, each groove 65 extends along the guide wall 64 in a right-and-left direction (or in such a direction as to be perpendicular to the axis of the pipe connector 70). Consequently, the support plate 81 can be assembled from either the right or left side.

Conversely, the locking protrusions 68 are provided along the right and left sides of the fit face surface of the mounting seat 63 (in locations opposing the assembly from either the right or left side). The locking protrusions 68 extend perpendicular to the guide grooves 65, i.e., along the same direction as the tube-fitting portion 62 in this embodiment. Each locking protrusion 68 includes an inner rising lock face 68A (see FIG. 12). The locking protrusions 68 oppose each other across the surface of the fit face of the mounting seat 63 and are symmetric with each other about the axis of the tube connector 60. A distance between the lock faces 68A (dimension D in FIG. 12) is set to be substantially equal to the distance between the sliding contact faces 82, or dimension A. For example, when the support plate 81 is inserted into the space defined by the grooves 65, upper and lower sliding contact faces 82A and 82B may directly oppose their corresponding grooves 65, as shown in FIG. 12. However, the sliding contact faces 82C and 82D of the support plate 81, 90° out of phase with sliding surfaces 82A and 82B, are located between the locking faces 68A of the locking protrusions 68 (connected location) when the axis of the rear portion of the tube connector 60 is aligned with the axis of the rigid pipe connector 70. As a result, the support plate 81 is held horizontally between the locking protrusions 68 and vertically between grooves 65 (as viewed in FIG. 12). Both connectors 60 and 70 are therefore locked with respect to a particular orientation of the operating direction of the retainer 30 and the direction of the tube-fitting portion 62. At the connected location, the locking faces 68A of the locking protrusions 68 and the inner walls of the grooves 65 oppose the corresponding sliding contact faces 82 whereupon both connectors 60 and 70 are inhibited from being turned relative to one another.

Figure 11:
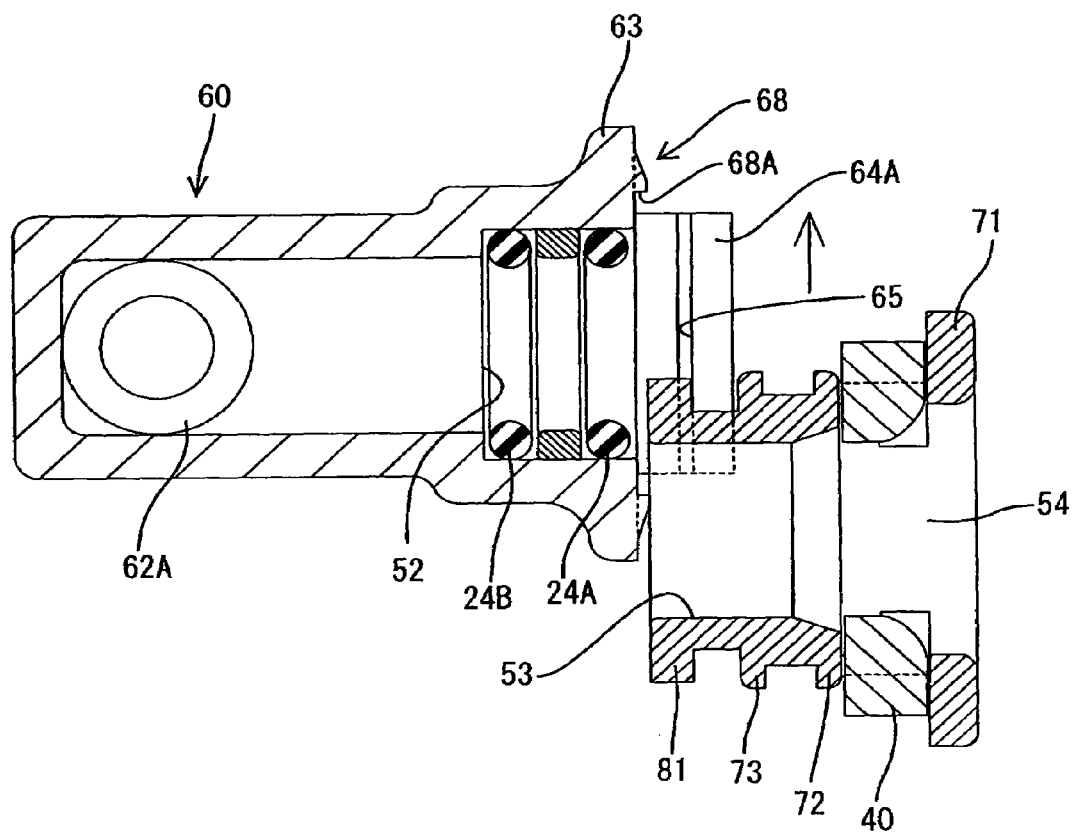
FIG. 11 is also a sectional view showing assembly of the pipe connector to the tube connector.
Figure 13:
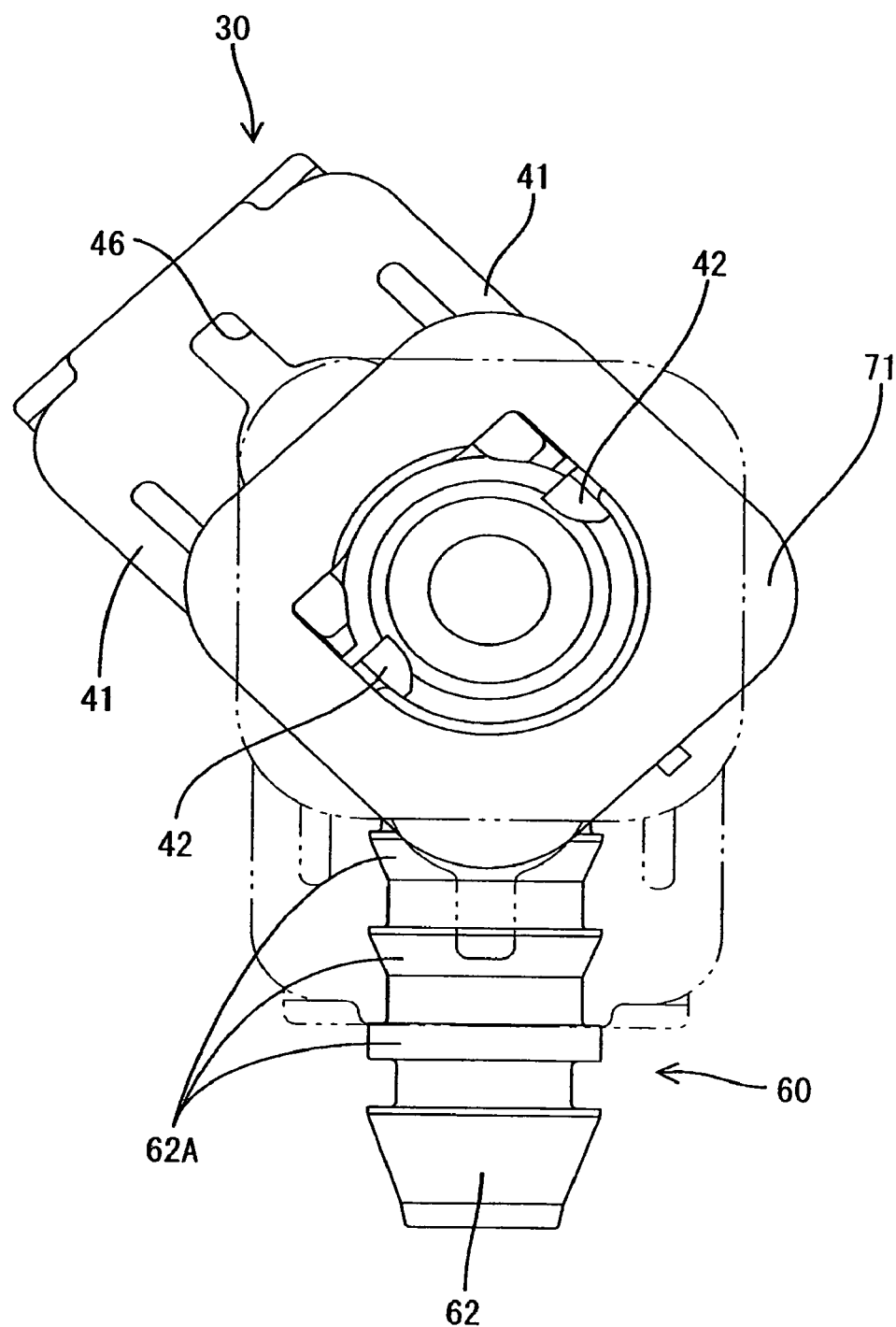
FIG. 13 is a sectional view showing the pipe connector coupled to the tube connector.
Figure 14:
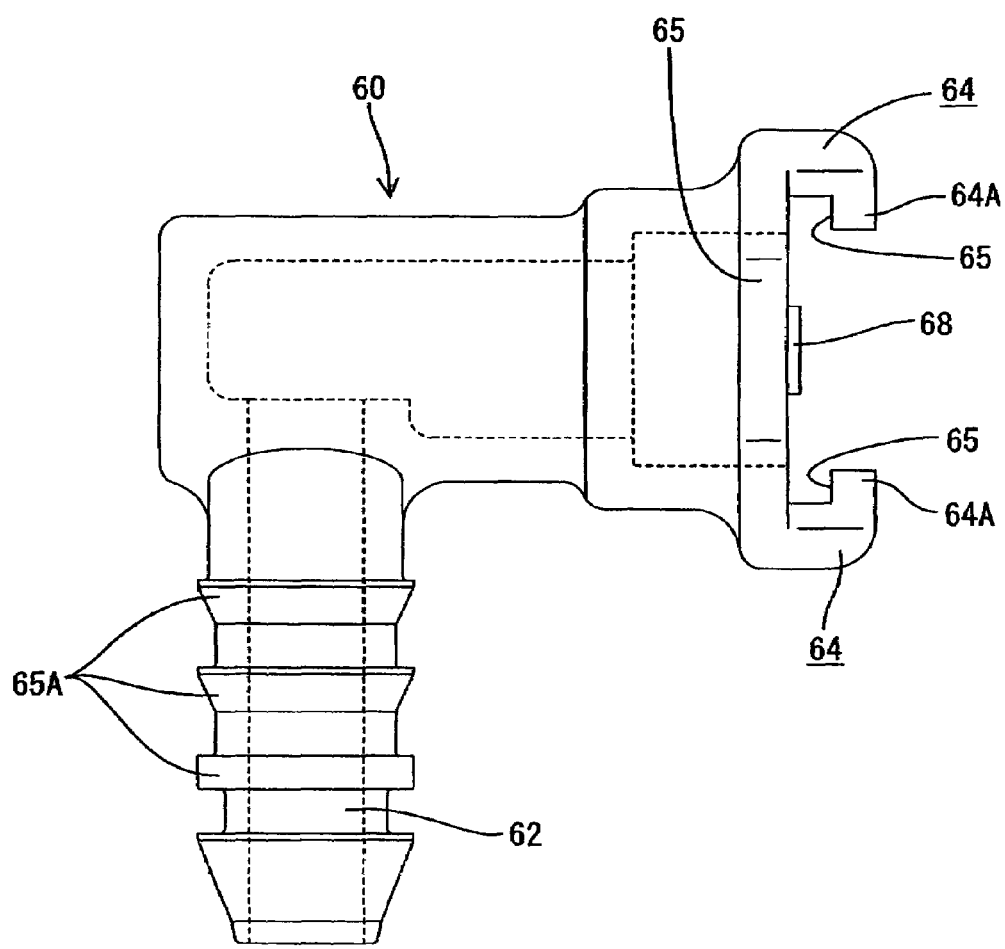
FIG. 14 is a side view of the tube connector.
Figure 15:
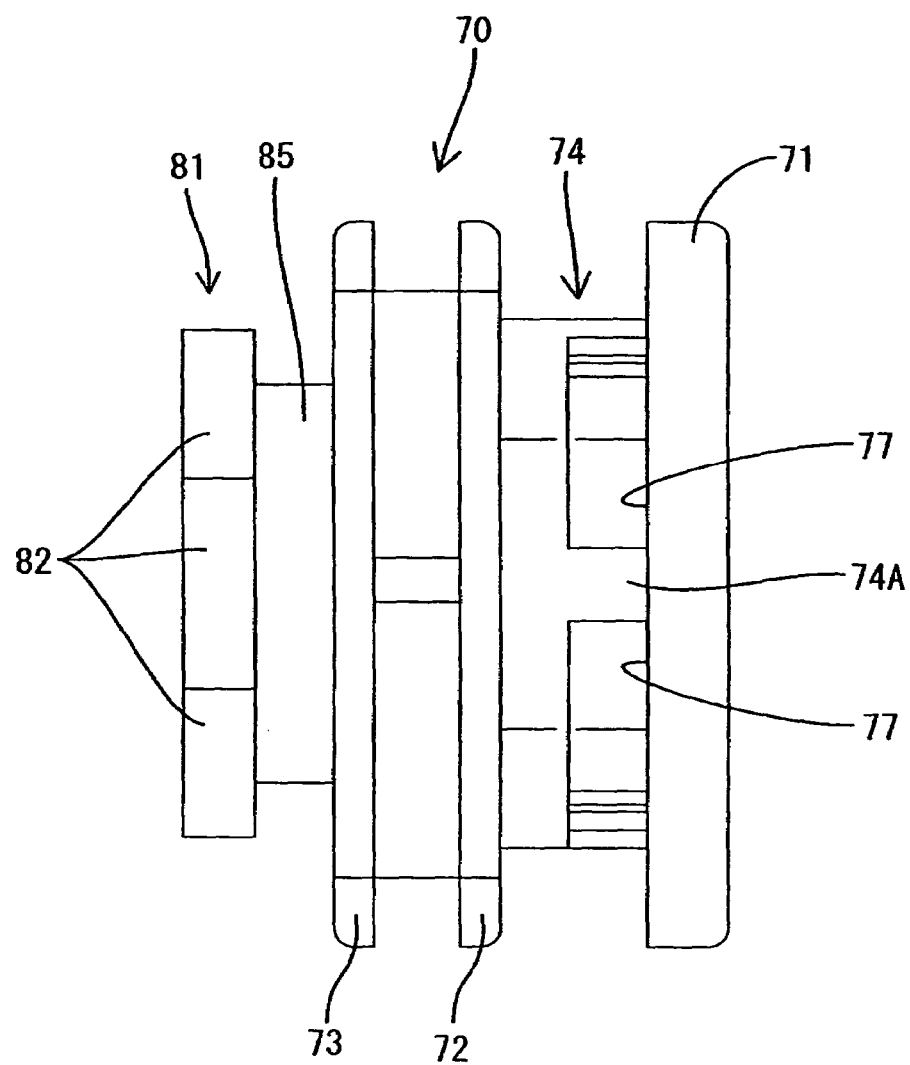
FIG. 15 is a plan view of the pipe connector.
Figure 16:
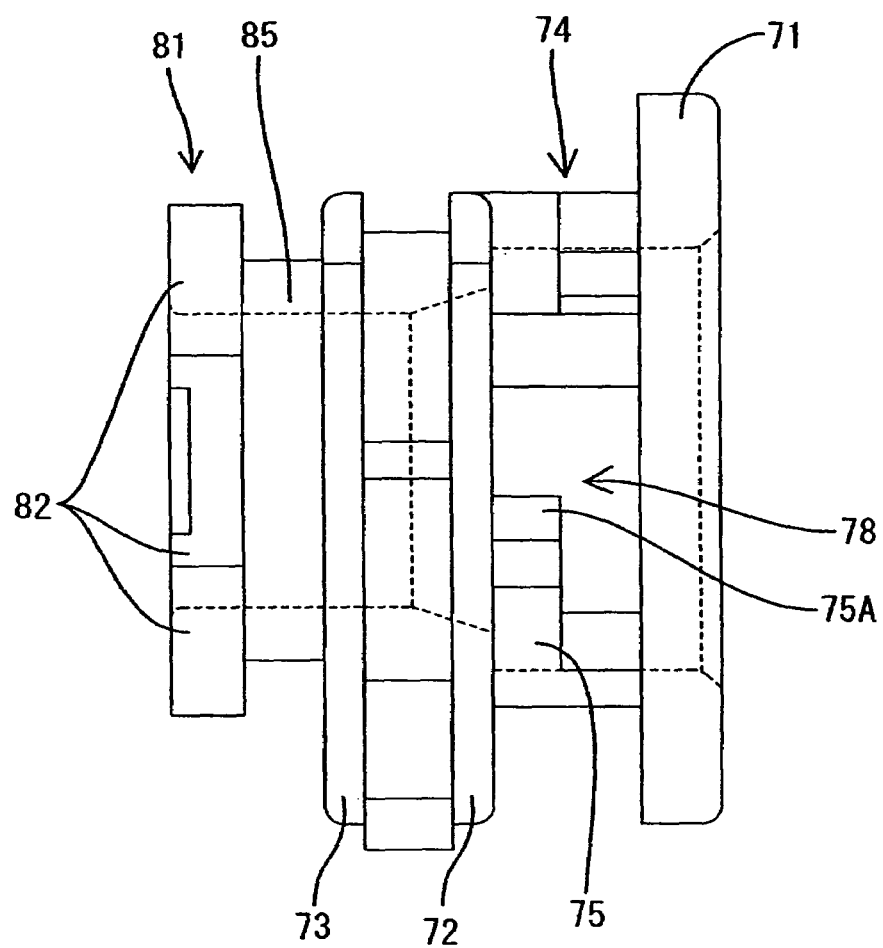
FIG. 16 is a side view of the pipe connector.

The forward face of the support plate 81, as viewed in FIG. 11, is brought into sliding contact with the outer faces of the locking protrusions 68 during the assembly of the connectors 60 and 70. Accordingly, the outer face of each locking protrusion 68 is formed into an inducing face with a radially outwardly and downward inclination, in order to smoothly facilitate assembly. Preferably, the support plate 81 is octagonal in shape as described above. Accordingly, the connectors 60 and 70 can be assembled together when any one of the sliding contact faces 82A to 82D is opposing a corresponding groove 65. As seen in FIG. 13, the direction of the retainer 30 can be changed so that the locking direction of the retainer 30 is oriented vertically, horizontally, angularly, or the like. In other words, for this embodiment the locking direction of the retainer 30 can vary about a full 360° at regular intervals of 45° relative to the direction of the extension of tube-fitting portion 62.

Furthermore, two seal rings 24A and 24B are disposed in the middle portion 52 of the insertion aperture 51 (see FIG. 3). The rear seal ring 24A opposes the front (the fitting face) of the support plate 81, and the rear seal ring 24B opposes the step formed between the front edge of the middle portion 52 and the adjacent portion of the tube connector 60. The insertion aperture 51, on the rigid pipe connector 70 side, has an inner diameter that is smaller than the inner diameter of the middle portion 52 (i.e., the diameter of this portion of the insertion aperture 51 is substantially equal to the smaller-diameter portion 53). Accordingly, when the connectors 60 and 70 have been connected together, the support plate 81 abuts the mounting seat 63 and is located ahead of the seal ring 24A, thereby maintaining both seal rings 24A and 24B in their desired locations. Additionally, the mounting seat 63 has a side that is shown in FIG. 12 and serves as the fitting face of the first piping connector in the invention. The support plate 81 has a side that is also shown in FIG. 12 and serves as a fitting face of the second piping connector in the invention.

The operation of the pipe joint will now be described. The procedure for connecting the tube S and rigid pipe 20 will be detailed. For this situation, the flexible tube S extends vertically and the retainer 30 is operated in a downward direction from the upper side, in which case optimum operability can be achieved.

Prior to mounting the pipe joint to the rigid pipe 20, the retainer 30 is set at the preliminary locking position on the pipe joint 50. The tube-fitting portion 62 is fitted into the tube S, joining the tube S to the pipe joint 50. In this state, the rigid pipe 20 is positioned for insertion into the insertion aperture 51 of the pipe joint 50. The locking flange 21 of the rigid pipe 20 advances toward the pipe joint 50 while the rigid pipe 20 is brought into sliding contact with the inner wall of the insertion aperture 51. The flange 21 abuts against the inclined guide faces 43 of the engagement claws 42. The locking flange 21 advances while spreading the engagement arms 41 apart. The rigid pipe 20 subsequently reaches the normal insertion position as shown in FIG. 4. When the rigid pipe 20 reaches the normal insertion position, the lower locking faces 42B of the engagement claws 42 are disengaged from the stepped portion 75. Accordingly, the guides 42C of the engagement claws 42 are directly opposite to the tapered portion 75A of the stepped portion 75, as shown in FIG. 7. The retainer 30 is then operated or moved in a locking direction (i.e., downwardly directed with regard to FIG. 7). The engagement arms 41 are further spread apart by the guides 42C and the tapered portions 75A, whereupon the engagement arms 41 are completely disengaged from the locking apertures 78.

When the engagement claws 42 have passed the stepped portions 75, the engagement arms 41 are elastically restored to their original configuration such that the engagement claws 42 engage seats 74B (the final locking position). When the engagement claws 42 reach the final locking position, the locking pieces 45 advance through the respective windows 77 into the insertion aperture 51, engaging the locking flange 21. As a result, the rigid pipe 20 is securely held and prevented from being inadvertently removed.

In the foregoing embodiment, the pipe joint body 50 comprises the tube connector 60 and the rigid pipe connector 70, both of which are separate from one another. Moreover, the support plate 81 is formed with eight sliding contact faces 82. The connectors 60 and 70 can be assembled together when any two opposing sliding contact faces 82A to 82D are directly opposite to the grooves 65, as shown in FIG. 12. Once the assembly is completed, the pipe joint can be subsequently maintained in the assembled state. Accordingly, The tube S may extend horizontally or at some angle when the same pipe joint 50 is applied to different types of applications, for example, different types of automobiles. As seen in these cases, the sliding contact faces 82 are selected and assembled to the grooves 65 when the connectors 60 and 70 are connected together. The mounting angles of both connectors 60 and 70 can be adjusted and the retainer 30 can always be operated in a downward locking direction from an upper side. Consequently, the retainer 30 can be locked without being forced to use an awkward assembling position. Accordingly, the retainer 30 of this embodiment results in relatively high assembly efficiency.

Figure 17:
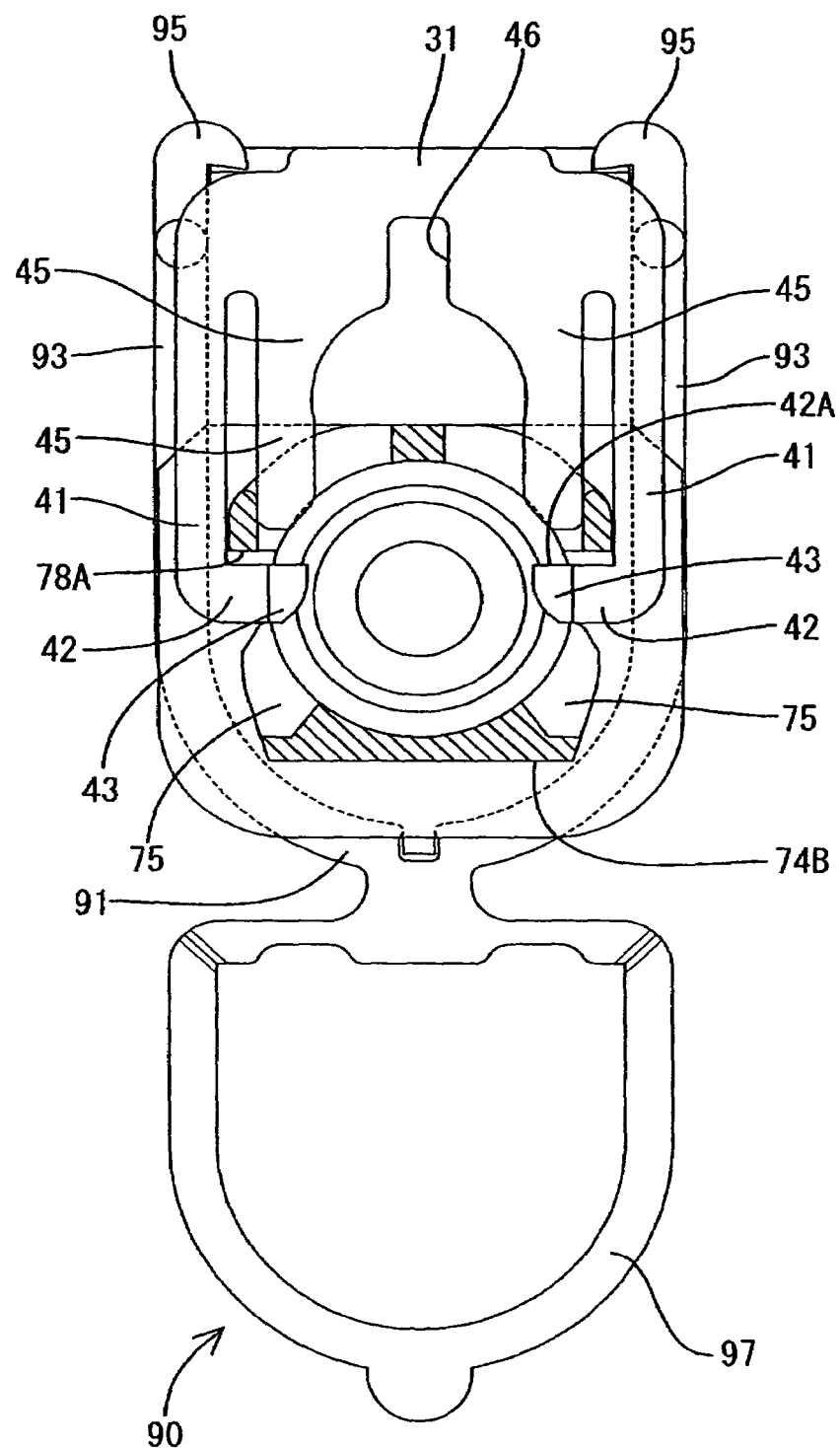
FIG. 17 is a sectional view of the pipe joint in accordance with a second embodiment of the invention.

FIG. 17 illustrates a second embodiment of the invention. In the second embodiment, a fitting detection checker 90 is added to the construction of the first embodiment. The second embodiment is the same as the first embodiment in all other respects. Accordingly, the identical or similar parts in the second embodiment are labeled by the same reference symbols as those in the first embodiment and another description of these parts may be eliminated.

Referring to FIG. 17, the fitting detection checker 90 comprises a generally U-shaped checker body 91 including a right and left elastic lock arm 93. The lock arms 93 are allowed to flex in the spreading direction (i.e., right and left directions as seen in FIG. 17). The checker body 91 includes an integrally formed outer looped operating portion 97. The fitting detection checker 90 is detachably attached to the pipe joint body 50 from below the pipe joint body 50 as viewed in FIG. 17. More specifically, the internal dimension between the lock arms 93 is substantially equal to the external dimension of the region defined between the protruding edges 72 and 73 of the pipe joint body 50. Accordingly, when both of the lock arms 93 are inserted into the space between the protruding edges 72 and 73, the walls of the protruding edges 72 and 73 limit the forward and rearward movement of the checker 90 relative to the pipe joint body 50. Consequently, only the upward and downward movement along the protruding edges 72 and 73 is allowed. The checker 90 is moved or operated in the same direction as the retainer 30.

Each lock arm 93 has a free end at which a corresponding locking claw 95 protrudes inward. The locking claws 95 are engageable with the top of the base 31 of the retainer 30. As a result, the checker 90 is prevented from removal in the direction of the extension of the protruding edges 72 and 73, or in a direction in which the checker 90 is operated so as to be detached from the pipe joint body 50. Furthermore, the engaging force of the locking claws 95 is determined to be larger than the operating force required when retainer 30 is operated in the locking direction to move from a preliminary locking position to the final locking position. Accordingly, when the checker 90 is pulled downward (i.e., in a locking direction), after the rigid pipe 20 has been inserted into a normal insertion position, the locking claws 95 and the retainer 30 remain in an engaged state. The retainer 30 automatically moves from the preliminary lock position to the final locking position when the operation for detaching the checker 90 is performed.

Subsequently, when pulled further in the same direction as described above, the checker 90 can be detached from the pipe joint body 50. When the fitting detection checker 90 is provided with the retainer 30, detachment of the fitting detection checker 90 confirms that the rigid pipe 20 has been fitted. Use of the fitting detection checker 90 can improve the reliability of the assembly procedure.

Figure 18:
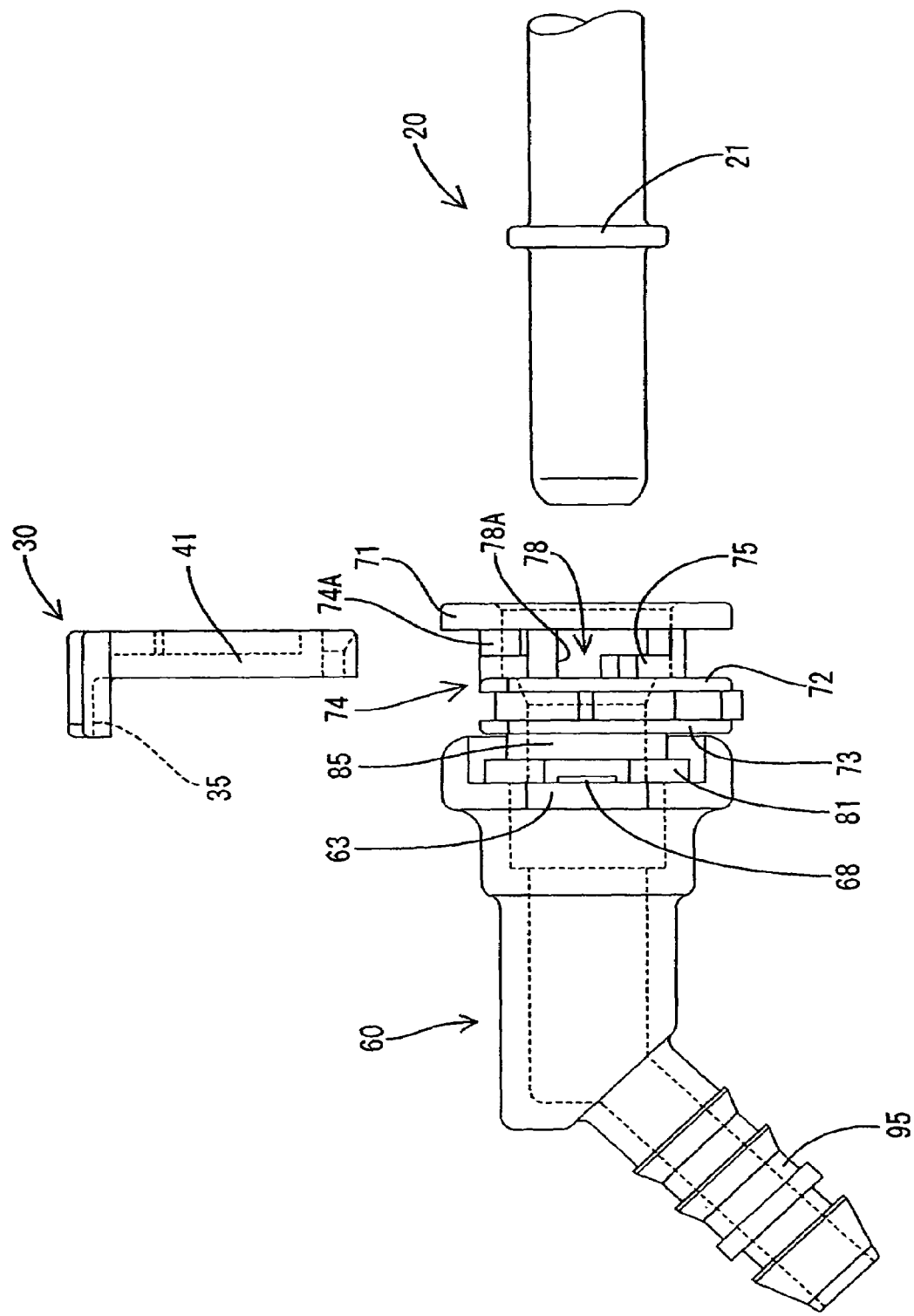
FIG. 18 is a sectional view of the pipe joint in accordance with a third embodiment of the invention.
Figure 19:
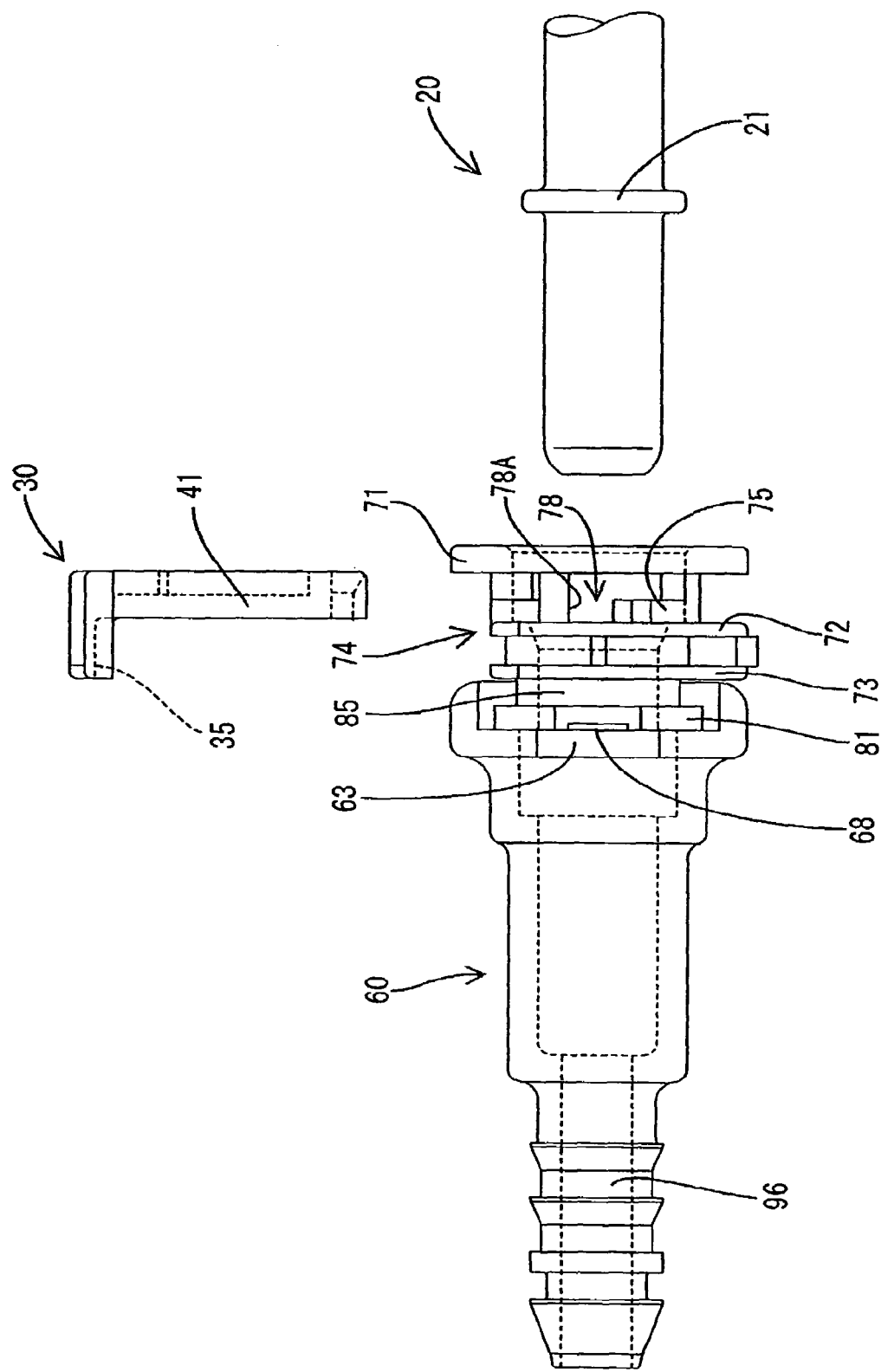
FIG. 19 is also a sectional view of the pipe joint in accordance with a third embodiment of the invention.

FIGS. 18 and 19 illustrate a third embodiment of the invention. The third embodiment differs from the first embodiment in the construction of the tube connector 60. More specifically, the tube connector 60 is bent into substantially an L-shape and the tube-fitting portion 62 extends downward. However, tube fitting portions 95 and 96 extend obliquely downward (downward and leftward in FIG. 18) or straightforward (only leftward in FIG. 19) in the third embodiment. Conversely, the mounting seat 63, the grooves 65, and the locking protrusions 68 in the third embodiment are identical to those in the first embodiment. The rigid pipe connector 70 (also identical to the first embodiment) is coupled to a coupling portion including the mounting seat 63, the grooves 65, and the locking protrusions 68.

Consequently, when the connecting interface between the tube connector 60 and the rigid pipe connector 70 has a common structure, the rigid pipe connector 70 and the retainer 30 from the first embodiment can be used with a variety of tube-fitting portions 62 having different constructions. Consequently, the pipe joint of the third embodiment may be considered for many more general-purpose applications.

The present invention should not be limited to the foregoing embodiments. For example, the technical scope of the invention encompasses at least the following modified forms.

The support plate 81 is formed into a regular octagonal shape in the foregoing embodiments. However, the support plate may have a regular polygonal shape, such as a square or regular hexagonal shape, among others, instead.

Furthermore, the tube connector 60 is provided with the grooves 65 and the pipe connector 70 is provided with the support plate 81 in the foregoing embodiments. However, the tube connector 60 may be provided with the support plate 81 and the pipe connector 70 may be provided with the grooves 65, instead.

Figure 20:
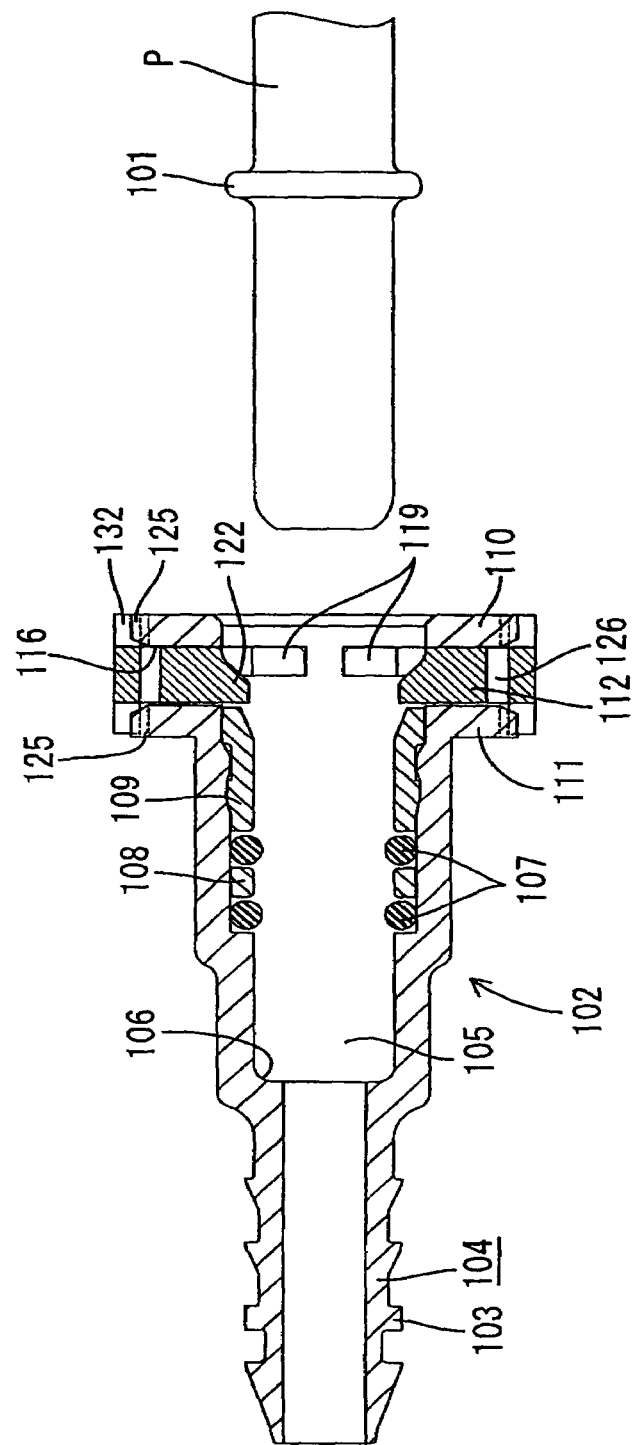
FIG. 20 is a sectional front view of the pipe joint body in the pipe joint in accordance with a fourth embodiment of the invention.

FIGS. 20 to 30 illustrate a fourth embodiment of the invention. Referring to FIG. 20, a rigid pipe P is made of a synthetic resin or a metal. A retaining flange 101 is formed in a distal end of the rigid pipe P so as to extend about the entire periphery. A pipe joint body 102 is made of a synthetic resin into a generally right cylindrical shape. The pipe joint body 102 has a distal end formed with a tube connector 104 having a plurality of engaging protrusions 103. A tube T is connectable to the tube connector 104. Furthermore, the pipe joint body 102 has a bore 105 formed therein so as to extend axially through the pipe joint body 102. The rigid pipe P is adapted to be inserted into the bore 105.

A stepped portion 106 is formed in a boundary between the bore 105 and a portion corresponding to the tube connector 104. The bore 105 has an entrance with stepped portion including a larger diameter. Two O-rings 107, a spacer 108, and an O-ring presser 109 are inserted in the larger diameter portion at the entrance of the bore 105 to seal the rigid pipe P to the pipe joint body 102.

The pipe joint body 102 has a flange 110 formed on the rear thereof so as to protrude radially outward. The flange 110 is formed into a generally square shape in this embodiment. The pipe joint body 102 further has a protruding edge 111 spaced axially to the front of the flange 110. The protruding edge 111 protrudes outward from the outer periphery of the body 102 except for a portion of the outer periphery opposed to the base 113 of the retainer 112. The non-protruding portion serves as a retainer attaching face 114 (see FIG. 22). A space defined between the flange 110 and the protruding edge 111 serves as a guide groove 116 (a guide) for guiding the retainer 111 and the checker 115.

Figure 21:
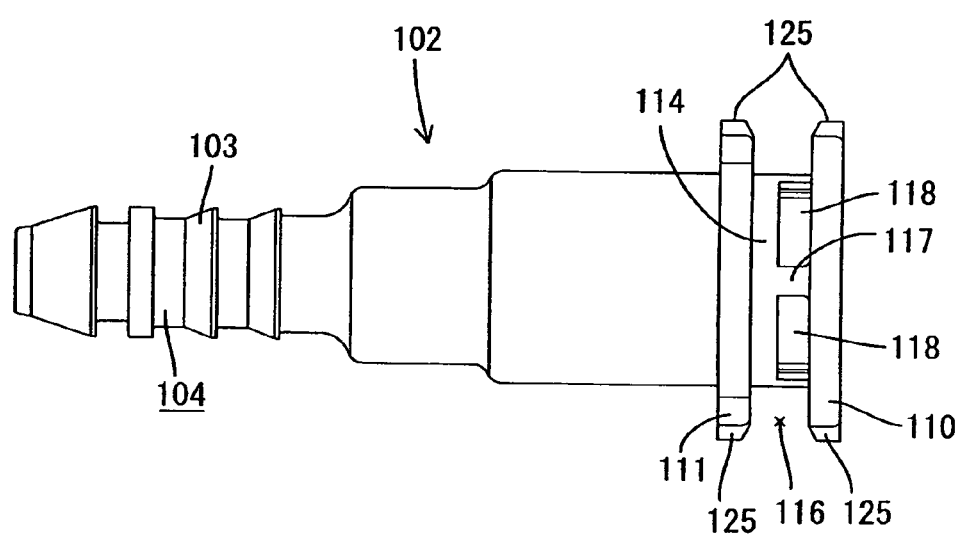
FIG. 21 is a plan view of the pipe joint body.
Figure 22:
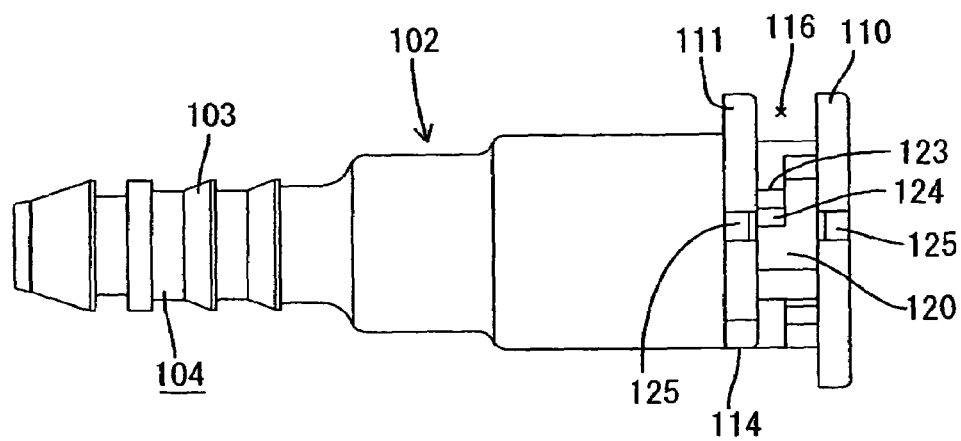
FIG. 22 is a front view of the pipe joint body.

The retainer attaching face 114 includes two windows 118 with a rib 117 interposed between the two windows 118, as shown in FIG. 21. The windows 118 communicate with the bore 105. The retainer 112 includes locking pieces 119 (rigid pipe locking portion, see FIG. 23) that are insertable into the windows 118. Two locking apertures 120 are open at opposite sides of the bottom of the guide groove 116 adjacent to the retainer attaching face 114 (see FIG. 22). The locking apertures 120 also communicate with the bore 105. The retainer 112 includes two engagement arms 121. Each engagement arm 121 has an engagement claw 122. The engagement claws 122 are inserted into and removed from the bore 105 through the corresponding locking apertures 120. Stepped portions 123 are formed at the front top corners of the locking apertures 120 (i.e., upper portions opposite to the entrance of the bore 105, as seen in FIG. 22) so as to approach the interiors of the locking apertures 120. Each stepped portion 123 includes a tapered face 124 formed in the lower end of an outside thereof. A pair of engagement protrusions 125 (engagement portions, see FIGS. 22 and 24) is formed on either side of each of the flange 110 and the protruding edge 111. The engagement protrusions 125 formed on each of the flange 110 and the protruding edge 111 are disposed peripherally opposed to each other.

Figure 23:
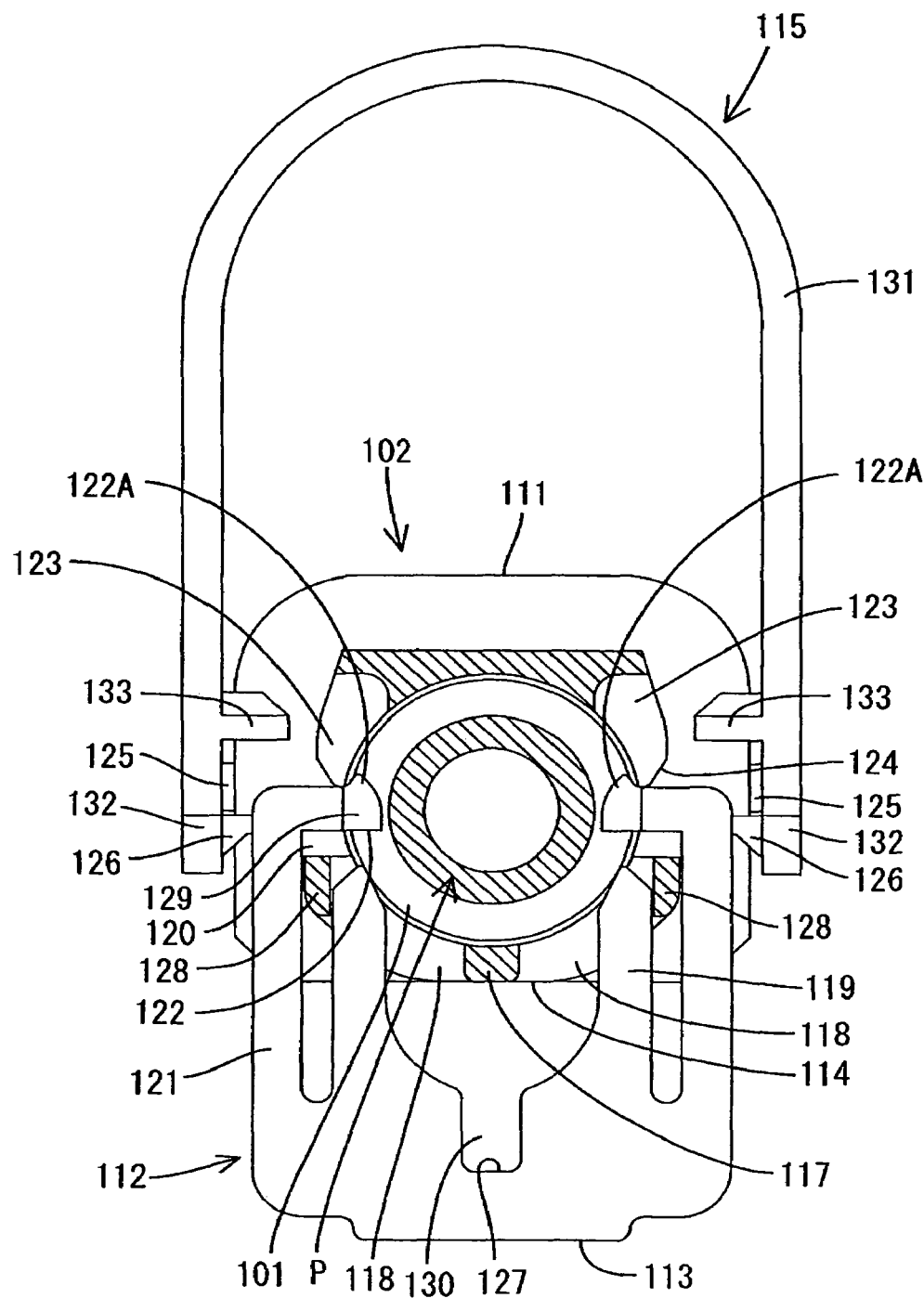
FIG. 23 is a sectional side view of the pipe joint in the case where the retainer is at a preliminary lock position.

The retainer 112 for preventing the rigid pipe P from removal will now be described. The retainer 112 is integrated to the checker 115 via a thin connecting portion 126 therebetween and preferably made from a synthetic resin (see FIG. 23). The retainer 112 includes a base 113 comprising a frontward extending protrusion serving as an abutting face (see FIG. 27). Two engagement arms 121 extend toward the pipe joint body 102 from opposite ends of the base 113. Each engagement arm 121 straddles the pipe joint body 102 across the side of the retainer attaching face 114. The distal end side of each engagement arm 121 is fitted within the guide groove 116 in closely adherent state. Furthermore, the distal end of each engagement arm 121 is bent inward into the form of an engagement claw 122. When the retainer 112 assumes the preliminary locking position, each engagement claw 122 is inserted through the lock aperture 120 into the bore 105, advancing partly into the region through which the retaining flange 101 passes during assembly. Each engagement claw 122 temporarily engages the stepped portion 123 so as to limit the upper movement of the retainer 112 to the preliminary locking position (the position as shown in FIG. 23). The opening edge of the lock aperture 120 has the side vertically opposed to the stepped portion 123 serves as a removal stopper 128, whereupon the retainer 112 is inhibited from being removed from the preliminary locking position by downward movement. Consequently, the retainer 112 is temporarily held in the preliminary locking position.

Each engagement claw 122 has a hook claw 122a formed on the distal end of the engagement claw 122. The hook claw 122a is directly opposed to the stepped portion 123 when the retainer 112 is held in the preliminary locking position. In the preliminary locking position, each hook claw 122a is engageable with an inner face of the stepped portion 123. As a result, even when there is a force is applied to push the retainer 112 towards the pipe joint body 102, the hook claw 125a can limit the spreading apart of each engagement claw 122 (and subsequent engagement arm 121) and thereby inhibit the removal of the engagement claws 122 from the lock apertures 120.

Each engagement claw 122 has an inclined guide face 129 with an inward inclination that opposes the direction of insertion of the rigid pipe P (see FIG. 23). When the rigid pipe P has reached the insertion depth (see FIGS. 24 and 28), the inclined guide faces 129 are brought into sliding contact with the retaining flange 101. The inclined guide faces 129 guide each engagement arm 121 to spread apart from one another so that each engagement claw 122 is forced radially outward, out of the bore 105. Furthermore, the tapered face 124 of the stepped portion 123 guides the engagement claws 122 of the engagement arms 121 of the retainer 112 so that the retainer 112 is brought into sliding contact with the bottom of the guide groove 116 through the further spreading apart of each engagement arm 121. As a result, the engagement arms 121 are resiliently returned to their original configuration when the engagement claws 122 reach the face of the guide groove 116 opposite to the retainer attachment face 114, elastically engaging the face. The retainer 112 is then held at the final lock position as shown in FIG. 25, and inhibited from inadvertently returning to the preliminary lock position.

The base 113 of the retainer 112 has a pair of bifurcated locking pieces 119 formed to the inside the engagement arms 121, inside of the base 113. The locking pieces 119 extend generally parallel to the engagement arms 121. Each locking piece 119 has a distal end that is held in a standby location outside of the bore 105, to allow the passage of the retaining flange 101 of the rigid pipe P during assembly, when the retainer 112 is in the preliminary lock position. When the retainer 112 is moved to the final locking position, the inner face of each locking piece 119 engages and opposes the rear face of the retaining flange 101, thereby preventing the inadvertent removal of the rigid pipe P.

Each locking piece 119 is thinner than each engagement arm 121. The locking pieces 119 and engagement arms 121 are disposed so that rear faces of each are substantially coplanar with one another. The locking pieces 119 do not interfere with the stepped portions 123 when the retainer 112 is in the final locking position. Furthermore, the locking pieces 119 have a root portion formed with a slit 130 into which a rib 117 is inserted when the retainer 112 enters the final locking position (see FIGS. 25 and 26), whereupon the locking pieces 119 do not interfere with the rib 117.

The checker 115 is disposed so as to confront the retainer 112 and so as to contain the retainer 112 inside of the checker 115. The checker 115 has a looped operating piece 131 extending along an extension of each engagement arm 121. The operating piece 131 has each end connected via a breakable, thin connecting member 126 to an outer face of the distal end of each engagement arm 121 or to a portion provided with each engagement claw 122. Further, a pair of removal preventing portions 132, protruding outward widthwise (see FIG. 27), is formed on each of the outer faces (i.e., front and rear faces) of the operating piece 131 so as to correspond to the connecting members 126. When the retainer 112 is located in the preliminary lock position, the removal preventing portions 132 engage with the engagement protrusions 125 so that the checker 115 is inhibited from being operated (or pulled) in the direction of extraction of the checker 115 or in other words, in the direction of arrow S in FIG. 27. The direction of extraction is the same as the locking direction of the retainer 112, moving the retainer 112 from the preliminary lock position to the final locking position. However, when the rigid pipe P is inserted into the bore 105 to the insertion depth, the engagement arms 121 are spread apart from one another (see FIG. 24). Together with the spreading of the engagement arms 121, the removal preventing portions 132 are shifted radially outward, disengaging the removal preventing portions 132 from the respective engagement protrusions 125. As a result, the checker 115 can be further operated in the direction of extraction.

Additionally, the operating piece 131 has a pair of position holders 133 formed on the inside thereof and located higher than the connecting portions 126 (see FIG. 23). The position holders 133 are located in the guide grooves 116 when the retainer 112 is located in the preliminary lock position. Each position holder 133 has a width substantially as large as or slightly smaller the groove width of the guide groove 116. Each position holder 133 can therefore limit the movement of the checker 115 so that the checker 115 may be prevented from being inclined relative to the retainer 112. If the checker 115 were allowed to be repeatedly angled back and forth while the retainer 112 was at the preliminary lock position, there is a possibility that repeated movement of the checker 115 would sever the connecting portions 126.

Figure 24:
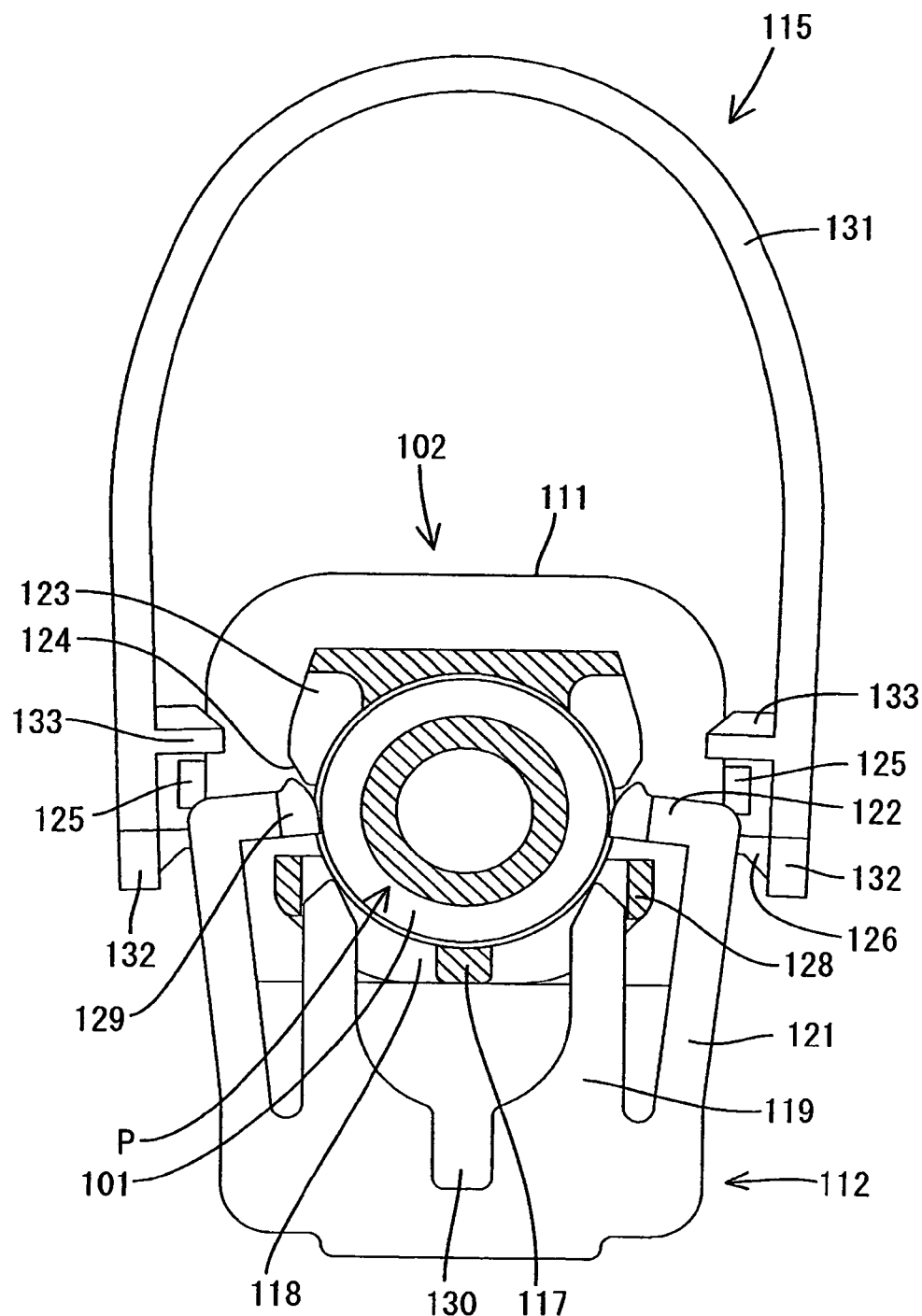
FIG. 24 is a sectional side view showing the case where the pipe has been inserted to a normal depth.
Figure 25:
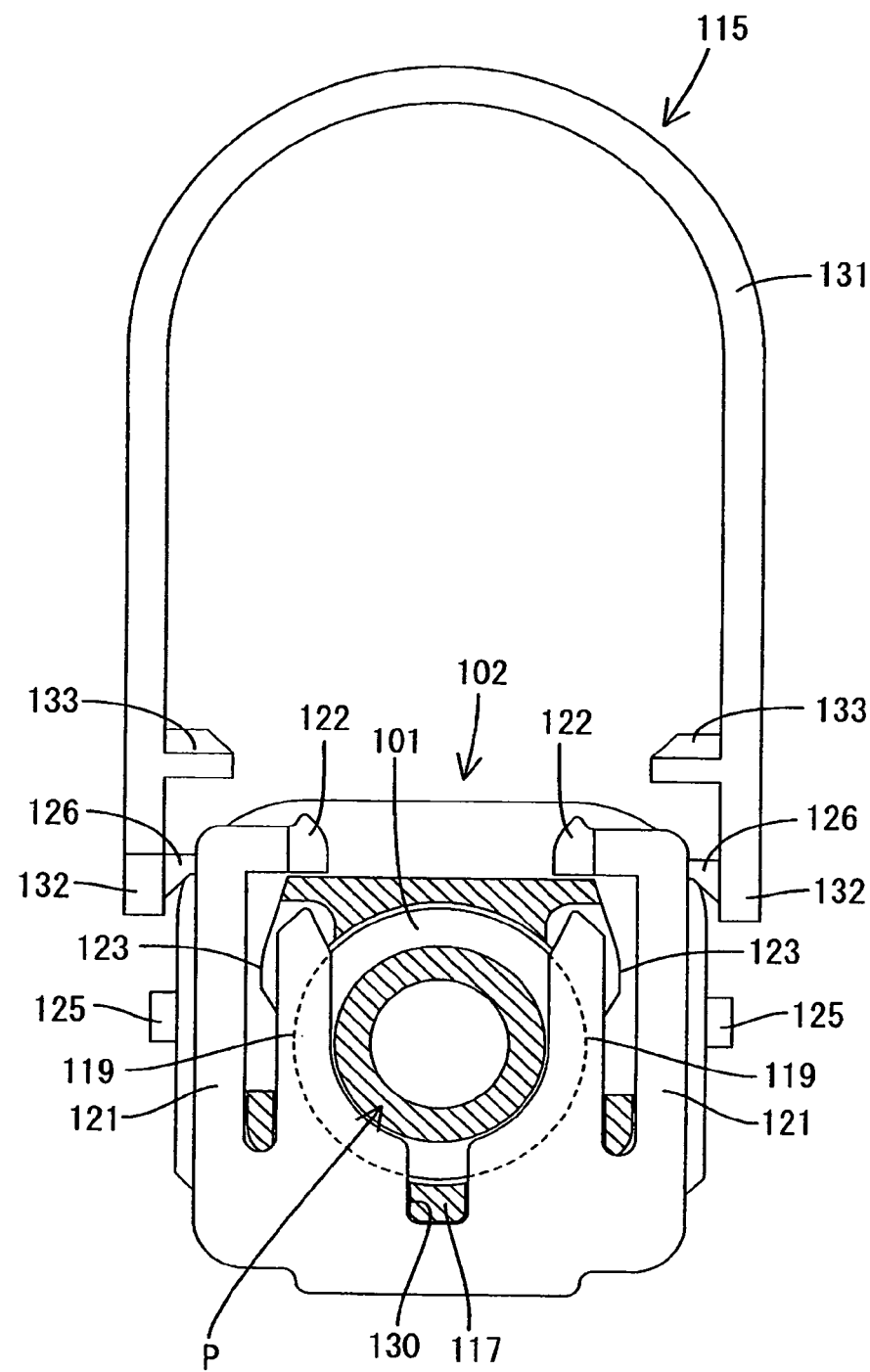
FIG. 25 is a sectional side view showing the case where the retainer has been moved to a lock position.
Figure 26:
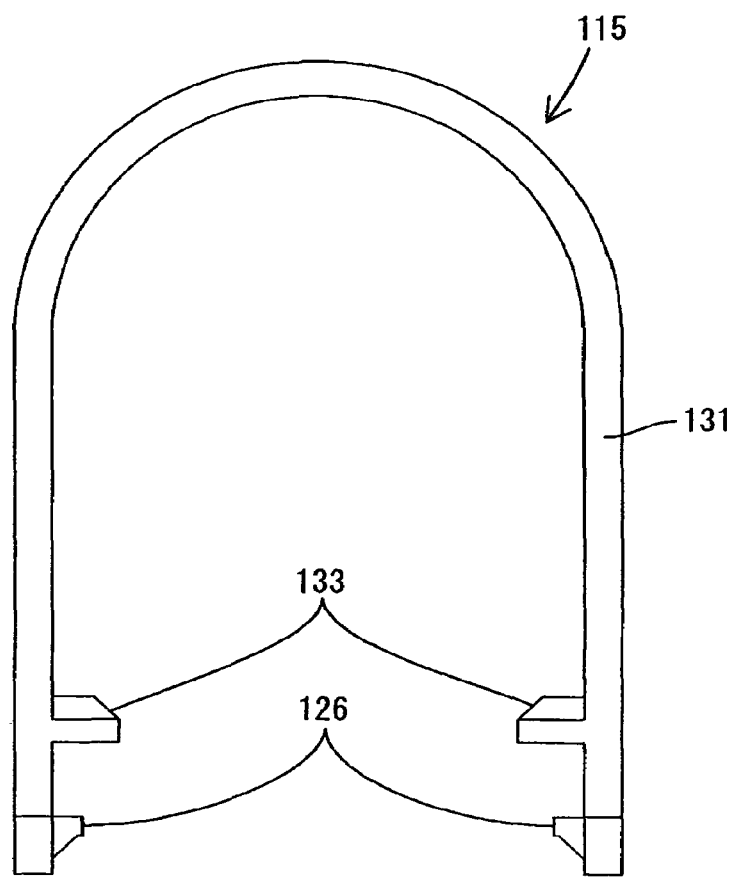
FIG. 26 is a sectional side view showing the case where the checker has been pulled out of the retainer.
Figure 26:
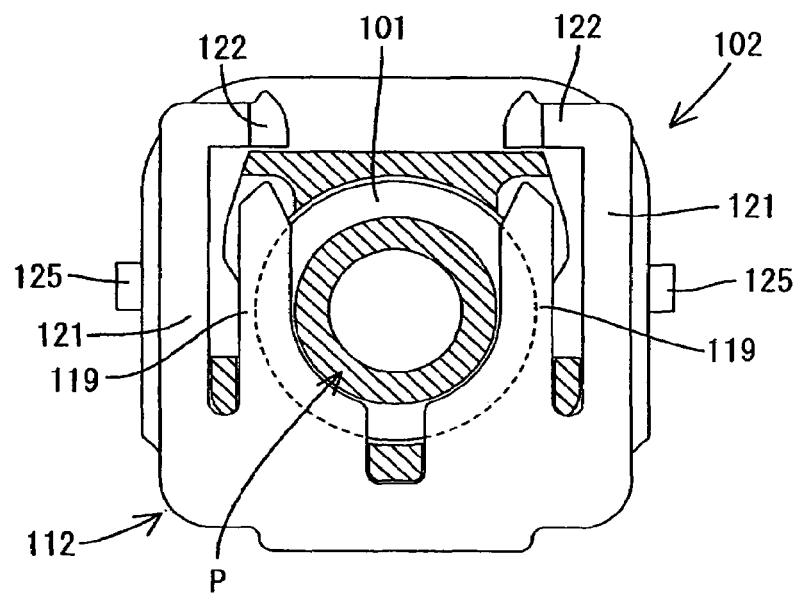
Figure 27:
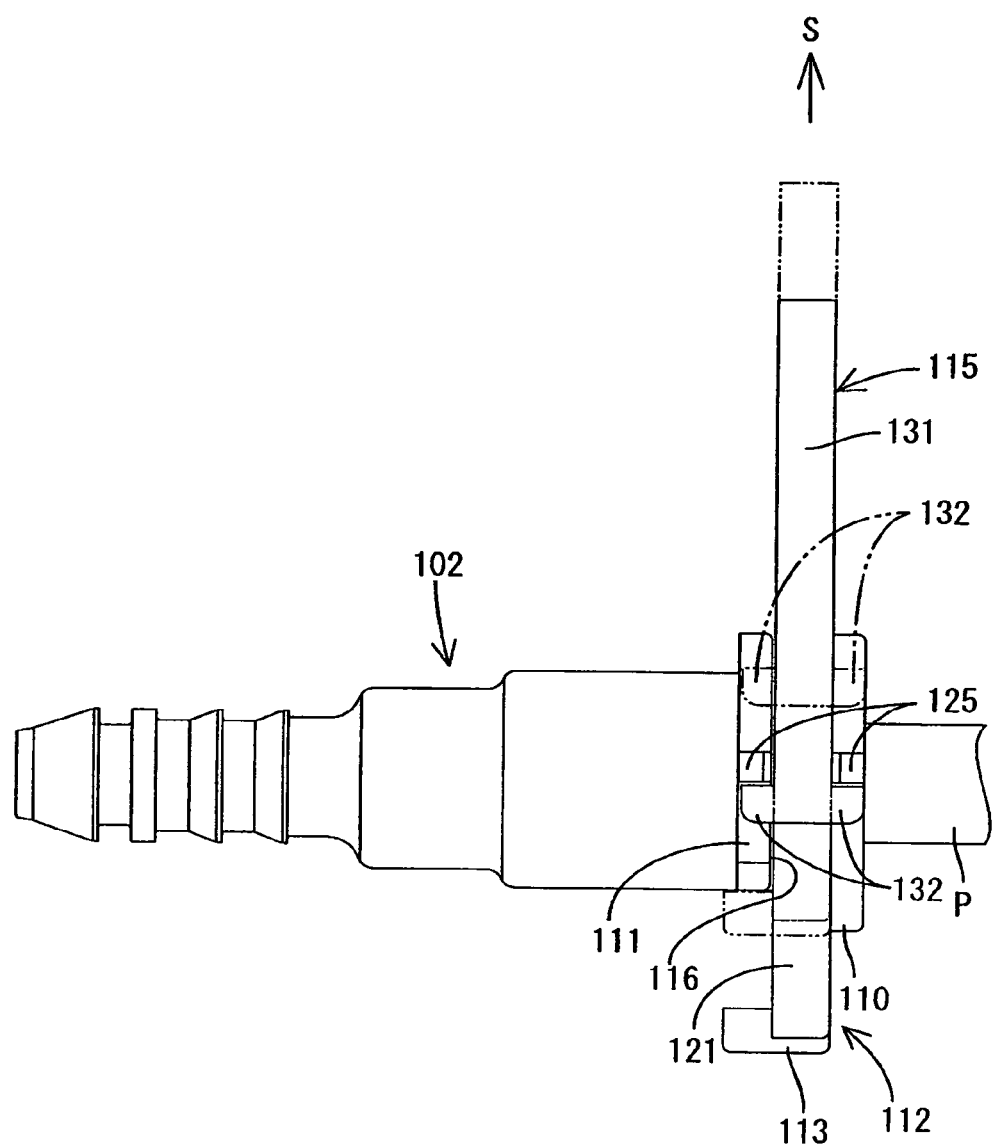
FIG. 27 is a front view showing the engagement of a hook and an engagement protrusion.
Figure 28:
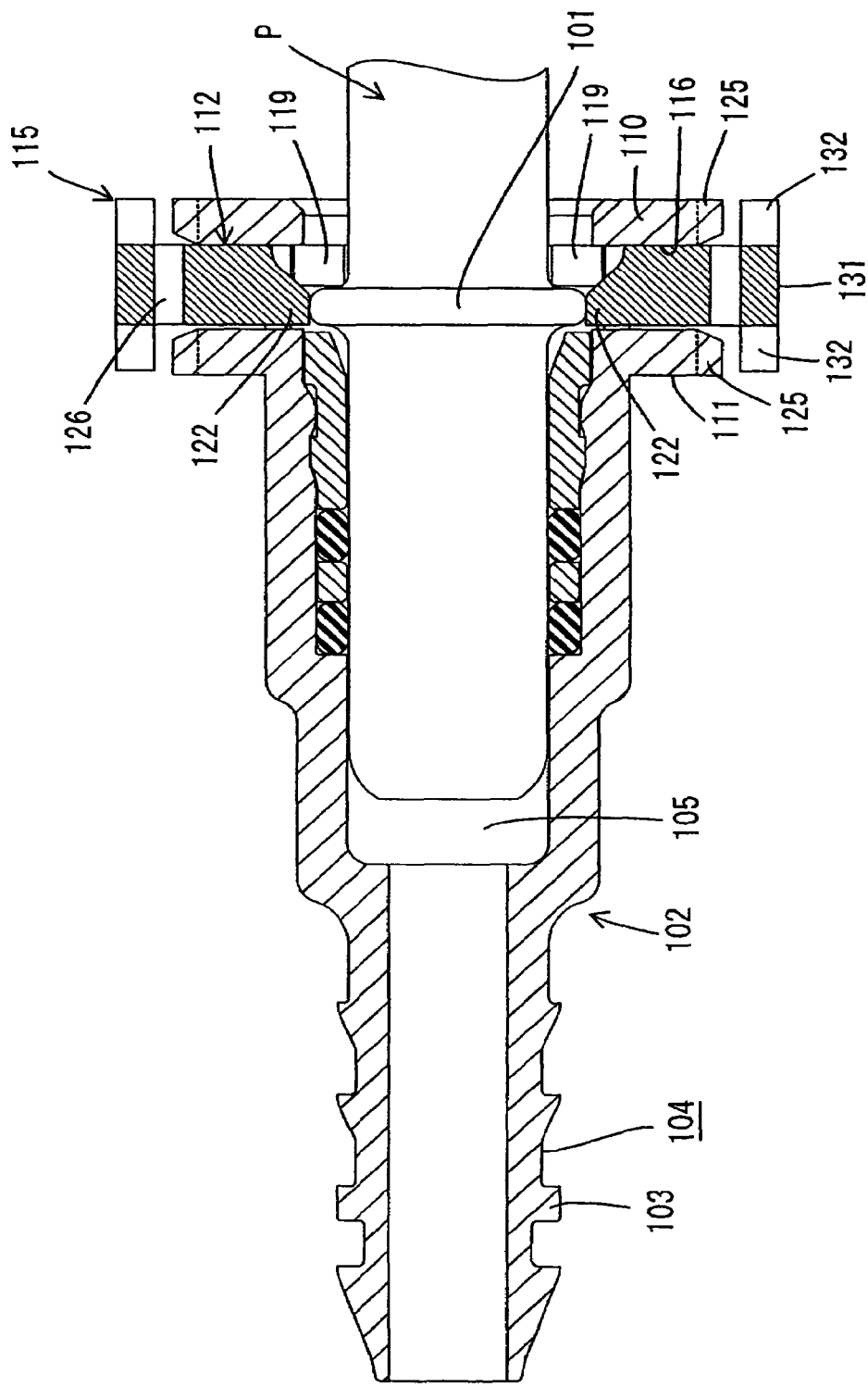
FIG. 28 is a sectional front view showing the condition where the pipe has been inserted to the normal depth when the retainer is at the preliminary lock position.
Figure 29:
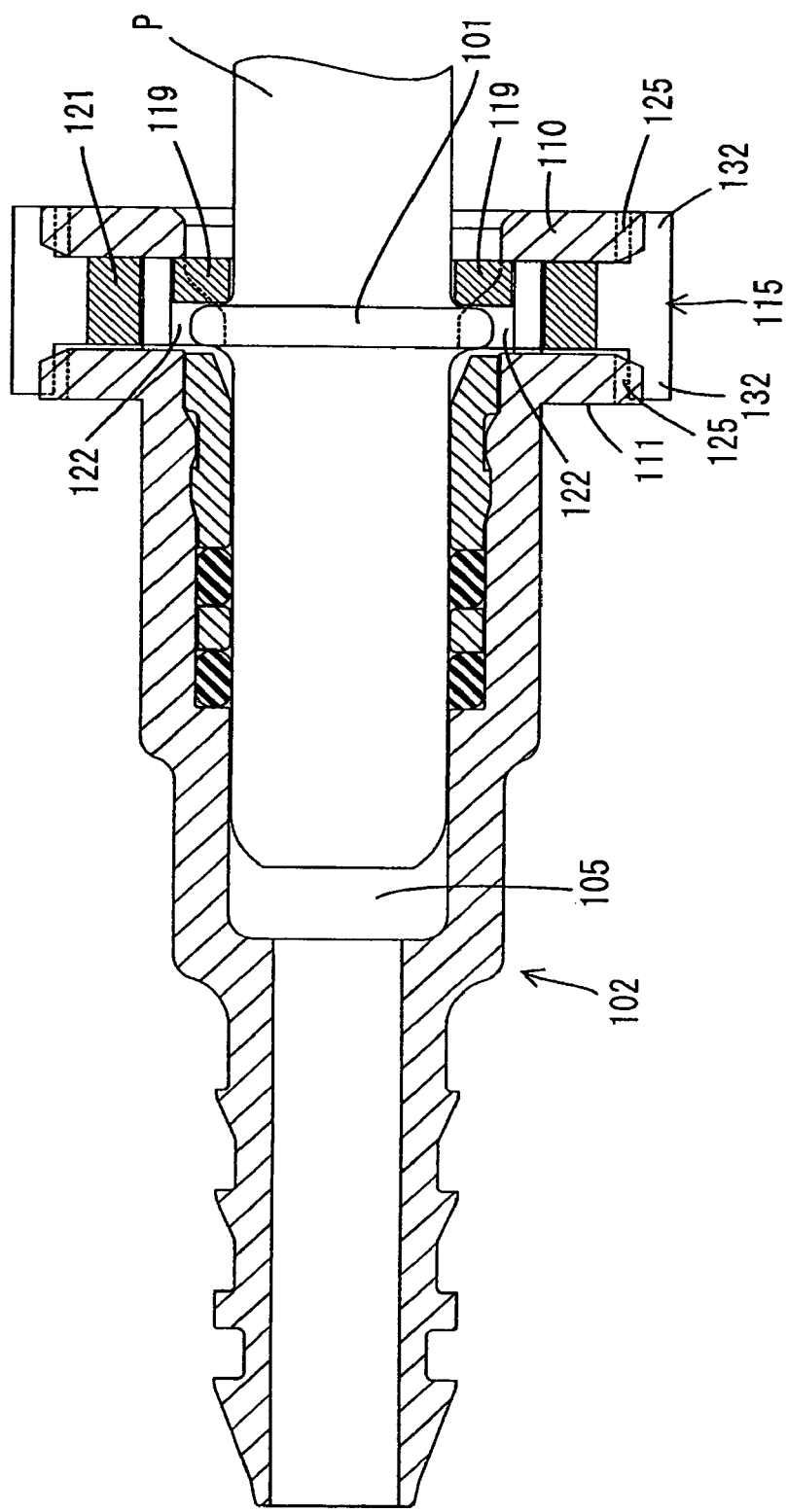
FIG. 29 is a sectional front view showing the condition where the retainer has been moved to the lock position.
Figure 30:
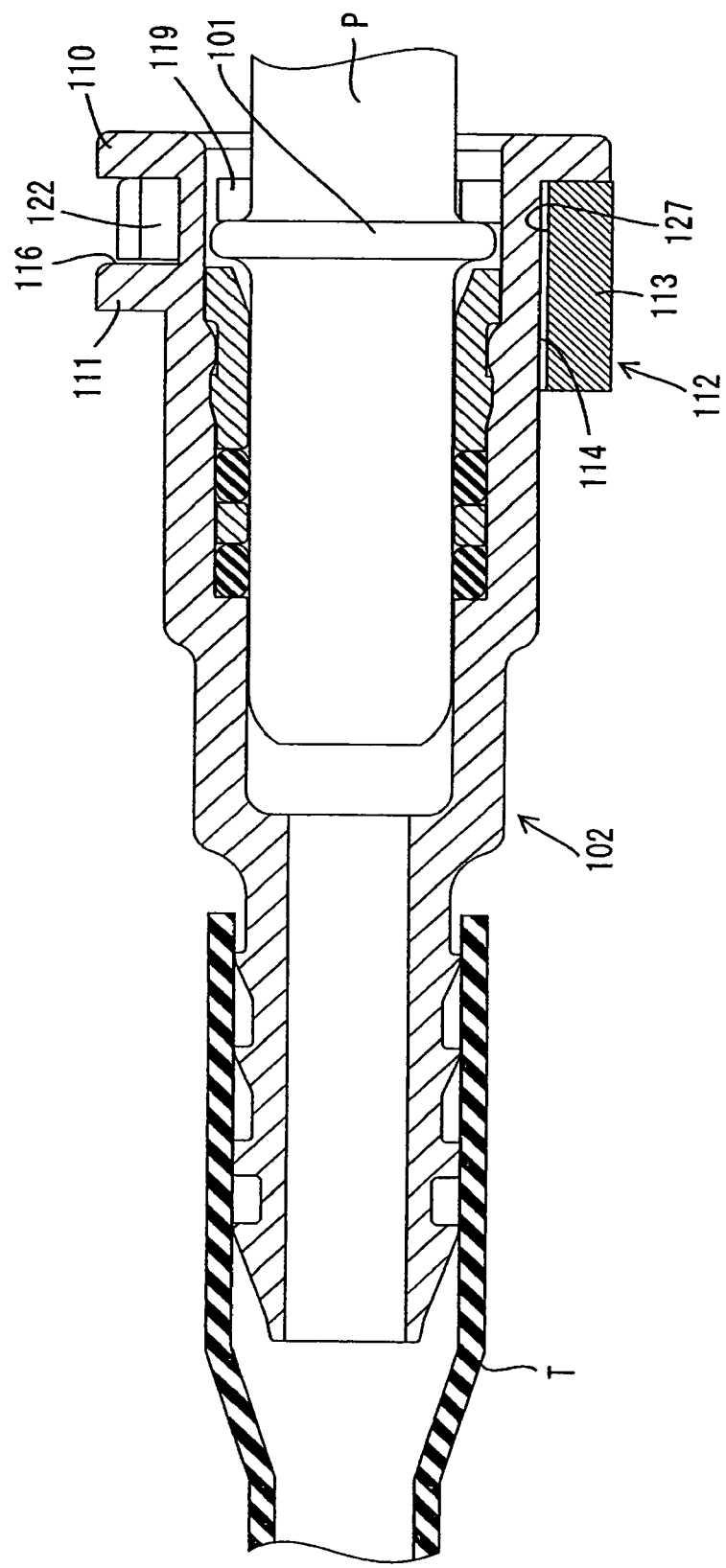
FIG. 30 is a sectional view taken at an angle differing by 90 degrees from the case of FIG. 10, showing the condition after the checker has been pulled off.
Figure 31:
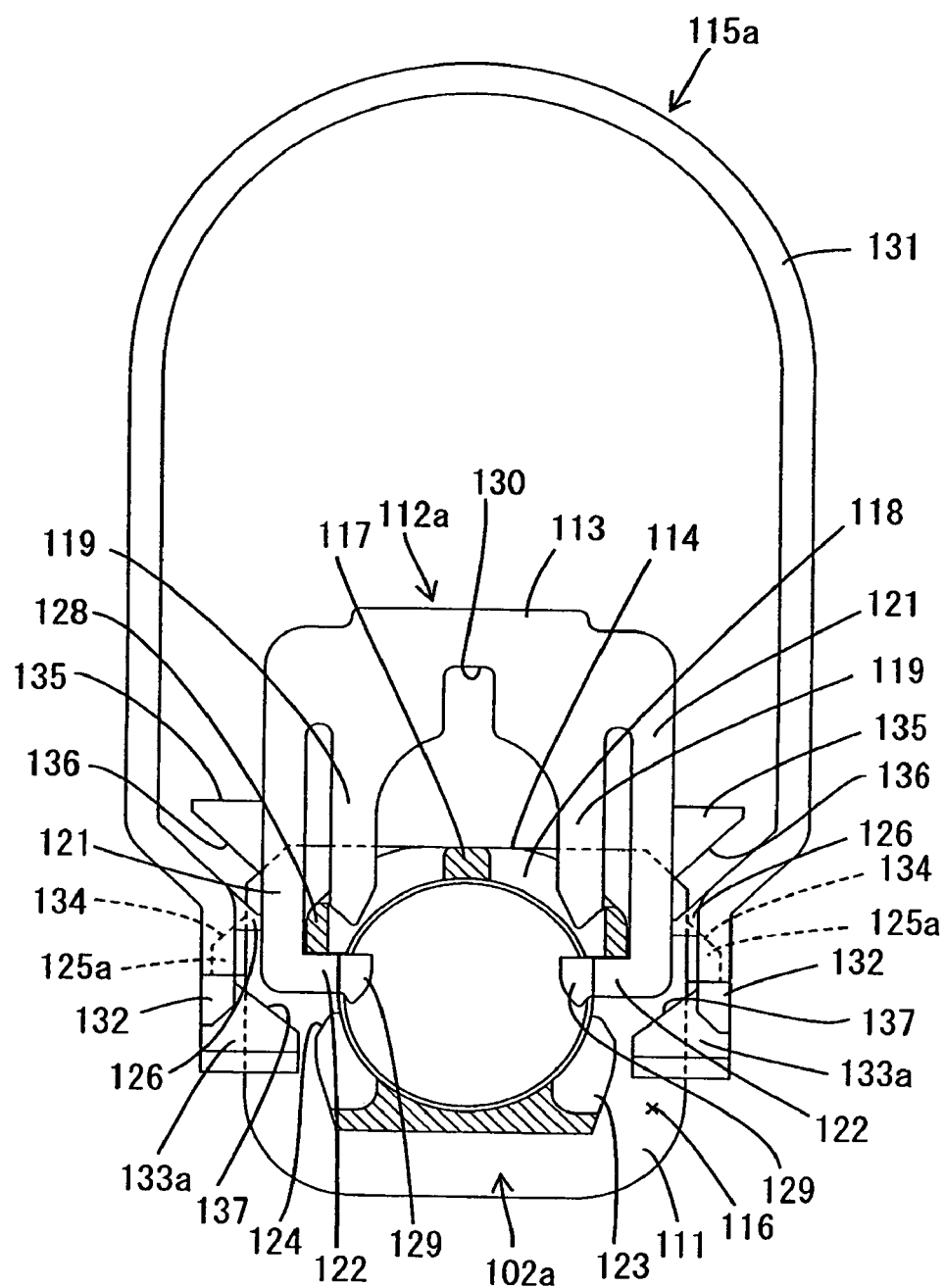
FIG. 31 is a sectional side view of the pipe joint in the state before insertion of the pipe in the fifth embodiment.

Furthermore, a part of the distal end of each position holder 133 slides along the guide groove 116 while the checker 115 is operated in the direction of extraction, so that the retainer 112 is moved from the preliminary lock position to the final locking position (see FIG. 24). Consequently, the inclination of the operating piece 131 relative to the retainer 112 is also limited during this operation. Each connecting portion 126 has such a breaking strength selected so that each connection between the connecting portion 126 and the retainer 112 is not severed during the movement of the retainer 112 from the preliminary lock position to the final locking position. The connection is able to be broken when the operating piece 131 is further pulled after the abutment face of the retainer 112, after having reached the final locking position, has abutted against the retainer attachment face 114.

The operation and advantages of the pipe joint of the fourth embodiment will now be described. The retainer 112 with the checker 115 is assembled to the pipe joint body 102 in the preliminary lock position and transported to a working site. The rigid pipes P and the tubes T are also located at the working site. While the retainer 112 is in the preliminary lock position, the engagement claws 122 of the retainer 112 engage the respective removal stopper 128 so that the retainer 112 is prevented from in advertent removal. Furthermore, the engagement claws 122 further engage the respective stepped portion 123 so that the retainer 112 is prevented from being inadvertently moved to the final locking position. Additionally, the position holders 133 are fitted into the respective guide grooves 116 so that the inclination of the checker 115 relative to the retainer 112 is limited. As a result, the connecting portions 126 can avoid unintended premature breakage to a relatively large extent. The pipe joints can be safely transported in this initial state to the work site.

Once at the work site, the rigid pipe P is initially inserted into the entrance of the bore 105 of the pipe joint body 102. The retaining flange 101 is thrust into the bore 105 while being brought into sliding contact with the inner wall of the bore 105. When the retainer 112 is in the preliminary lock position, the locking pieces 119 of the retainer 112 are located outside of the passage area of the retaining flange 101 in the bore 105. Accordingly, the retaining flange 101 is prevented from interfacing with the locking pieces 119 during this stage of assembly. However, the inclined guide faces 129 of the engagement claws 122 are located within the bore 105. The inclination of the inclined guide faces 129 spreads apart the engagement arms 121 when the retaining flange 101 is brought into sliding contact with the inclined guide faces 129. When the rigid pipe P is inserted into the bore 105 to reach the insertion depth, the spread state of the engagement arms 121 causes the engagement claws 122 to retreat outside of the area of the bore 105, whereupon the engagement claws 122 are disengaged from the stepped portions 123 (see FIG. 24). Since the ends of the operating piece 131 also move with the spreading apart of the engagement arms 121, the removal preventing portions 132 move outward from the engagement protrusions 125, disengaging from the engagement protrusions 125. When the operator grips the operating piece 131 and pulls the checker 115 in the direction of arrow S in FIG. 27 under the conditions shown in FIG. 24, the engagement arms 121 are brought into a sliding contact with the outer tapered faces 124 of the stepped portions 123. The engagement arms 121 are further spread via the sliding contact with the outer tapered faces 124. The engagement arms 121 are moved in the direction in which the operating piece 131 of the checker 115 is pulled, subsequently being brought into sliding contact with the top portions of the left and right sides of the guide groove 116. The engagement claws 122 resiliently return in a closing direction (i.e., towards each other) to engage the upper face of the pipe joint body 102 (i.e., the face opposite to the retainer attachment face 114). As a result, the retainer 112 assumes the final locking position and is accordingly held in a state where the retainer 112 is prevented inadvertent removal from the pipe joint body 102. Furthermore, when the retainer 112 is located in the final locking position, the locking pieces 119 enter the bore 105 and engage the rear face of the retaining flange 101. At this point, the rigid pipe P is prevented from removal.

The operating piece 131 of the checker 115 is pulled so that the retainer 112 is placed into the final locking position as described above. When the abutment face 127 is in abutment with the retainer attachment face 114, further pulling of the operating piece 131 applies a pulling force to the connecting portions 126, severing them.

When the rigid pipe P is insufficiently or incorrectly inserted into the bore 105 and therefore has not reached the full insertion depth, the engagement arms 121 may be either not spread apart at all or are insufficiently spread apart. Accordingly, the removal preventing portions 132 are maintained in engagement with the engagement protrusions 125. As a result, pulling the operating piece 131 of the checker 115 results in the pulling force being received by the engagement protrusions 125 via the engagement of the removal preventing portions 132. Consequently, the retainer 112 cannot be moved to the final locking position and the connecting portions 126 are not directly subjected to a breaking force. Accordingly, when the operator senses that the checker 115 cannot be pulled out, the operator immediately understands that the rigid pipe P is incompletely or inaccurately inserted into the bore 105, and then realizes that the rigid pipe P must be re-inserted.

The operator can therefore reliably detect incomplete insertion of the rigid pipe P based on the status of the checker 115. In this embodiment, the connecting portions 126 integrate the retainer 112 and the checker 115 prior to transporting the pipe joint to the work site. Consequently, the number of components can be reduced as compared with the prior art. Additionally, the checker 115 is pulled in order to initially place the retainer 112 in the final locking position, and subsequently, the checker 115 can be removed when pulled further in the same direction. In other words, the checker 115 is only operated in one direction to lock the retainer 112 in place and remove the checker 115. Therefore, the working efficiency during assembly may be improved.

The hook claws 122a are in engagement with the stepped portions 123 when the retainer 112 is in the preliminary lock position and no rigid pipe P is completely inserted into the bore 105. Accordingly, even when an external force is applied to the retainer 112 in an attempt to thrust the retainer 112 into the bore 105, the spreading apart of the engagement arms 121 is limited by the hook claws 122a. Therefore, movement of the retainer 112 due to the external force is limited when the rigid pipe P is not completely or accurately inserted into the bore 105.

FIGS. 31 to 36 illustrate a fifth embodiment of the invention. In the fourth embodiment, the direction in which the checker 115 is operated is the same as the direction in which the retainer 112 is moved from the preliminary lock position to the final locking position. However, these two directions are opposite to each other in the fifth embodiment. In the following description of the fifth embodiment, the identical or similar parts in the fifth embodiment are labeled by the same reference symbols as those in the fourth embodiment and another description of these parts may be eliminated.

The pipe joint body 102a has approximately the same construction as that of the fourth embodiment but differs in that each engagement protrusion 125a is shifted to the retainer attachment face 114 side from the vertically middle portions of the flange 110 and the protruding edge 111. Furthermore, each engagement protrusion 125a has an inclined guide face 134 formed on an upper side thereof. Each inclined guide face 134 has a downward inclination in order to allow the removal preventing portions 132 to smoothly slide over the engagement protrusions 125a when the retainer 112a with the checker 115a is attached to the pipe joint body 102a and the retainer 112a is placed in the preliminary lock position.

Each engagement protrusion 125a has a horizontal lower side so as to reliably engage the upper surface of the removal preventing portion 132.

The retainer 112a has a pair of escape protrusions 135 formed on the middle portions with respect to length of the outer faces of the engagement arms 121. The escape protrusions 135 cause the removal preventing portions 132 to avoid interference with the engagement protrusions 125a when the checker 115a is removed, as will be described in detail later. Each escape protrusion 135 has an inclined face 136 with an upward inclination along the direction in which the checker 115a is removed. When the retainer 112a assumes the preliminary lock position, the escape protrusions 135 are located above the engagement protrusions 125a (see FIG. 31). However, when the retainer 112a has been moved to the final locking position, the escape protrusions 135 are located just below the engagement protrusions 125a, so as to be adjacent to the engagement protrusions 125a (see FIG. 33). Furthermore, each escape protrusion 135 is formed to have a larger outward protrusion distance than the outward protrusion distance of each engagement protrusion 125a.

Furthermore, the abutment face 127, formed in the inner face of the body 113 of the retainer 112, serves as the face abutting the pipe joint body 102a. In the fourth embodiment, the face abutting the pipe joint body 102 resisted the pulling force applied to the checker 115. In the fifth embodiment, the engagement claws 122 of the engagement arms 121 resist the pulling force of the checker 115a by engaging the pipe joint body 102a (see FIG. 33). Accordingly, the inner face of each engagement claw 122 functions similarly to the face abutting in the fourth embodiment.

The checker 115a in the fifth embodiment differs from the checker 115 in the fourth embodiment. The retainer 112a is disposed inside of the loop formed by the operating piece 131. However, the operating piece 131 includes each end (located lower than the removal preventing portions 132) further having position holding portions, 133a formed on each inner face so as to protrude inward. A tapered sliding contact face 137 is formed on an upper surface (a face at the side towards which the checker 115a is pulled) of each position holding portion 133a. When the checker 115a is pulled, each sliding contact face 137 is brought into sliding contact with the inclined face 136 of each escape protrusion 135 (see FIG. 34). The sliding contact with the inclined face 136 allows the checker 115a to smoothly pass over each escape protrusion 135. Consequently, interference between the removal preventing portions 132 and the escape protrusions 135 can generally be avoided.

Figure 32:
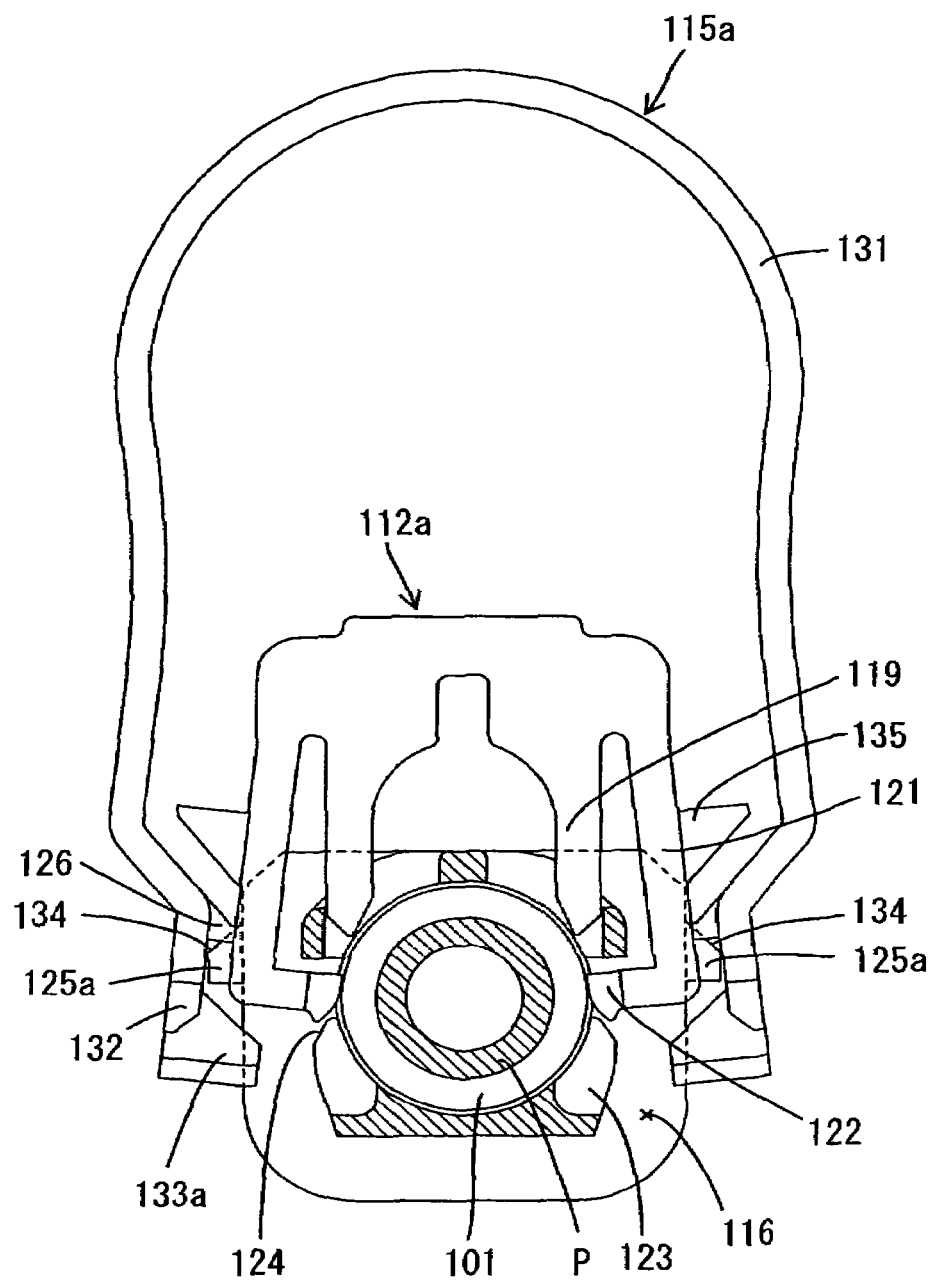
FIG. 32 is a sectional side view of the pipe joint, showing the condition where the pipe has been inserted to a normal depth when the retainer is at the preliminary lock position.
Figure 33:
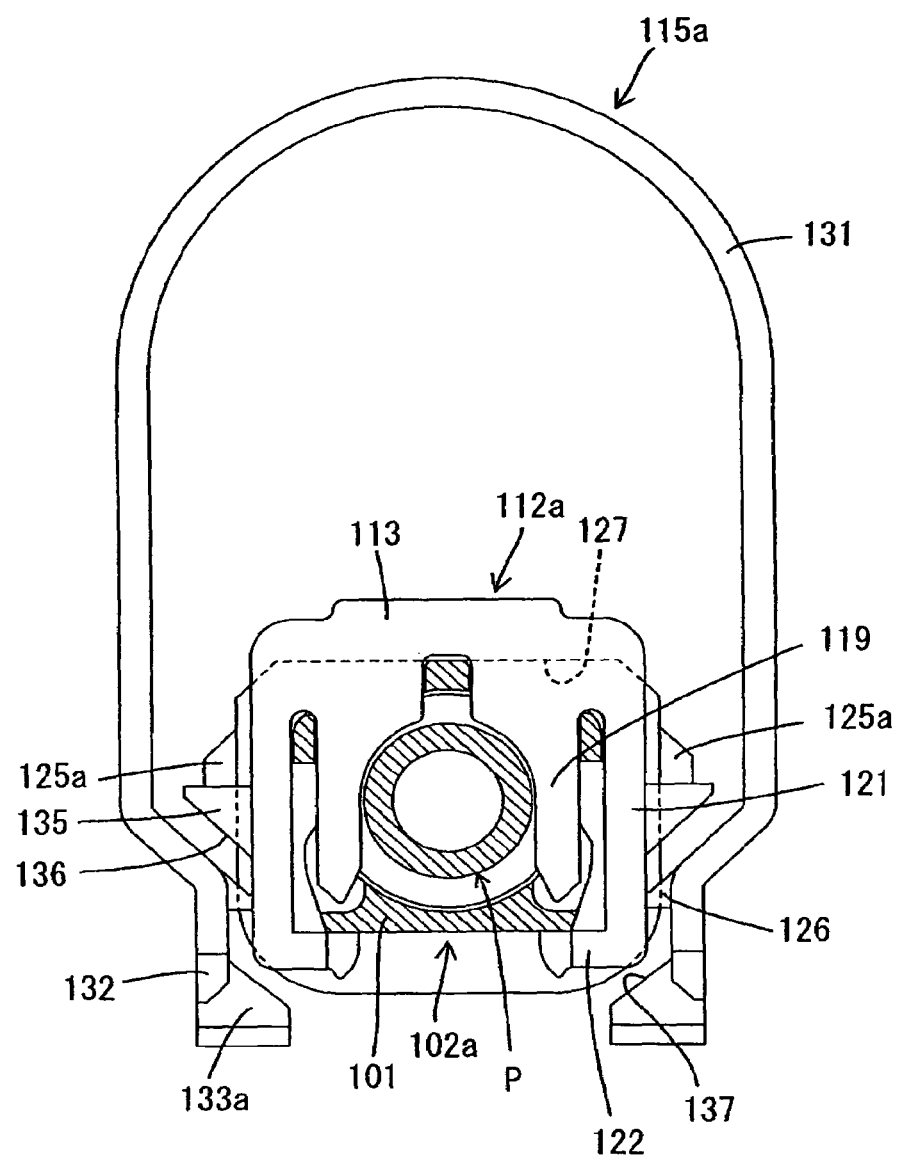
FIG. 33 is a sectional side view of the pipe joint under the condition where the retainer has been thrust into the lock position.
Figure 34:
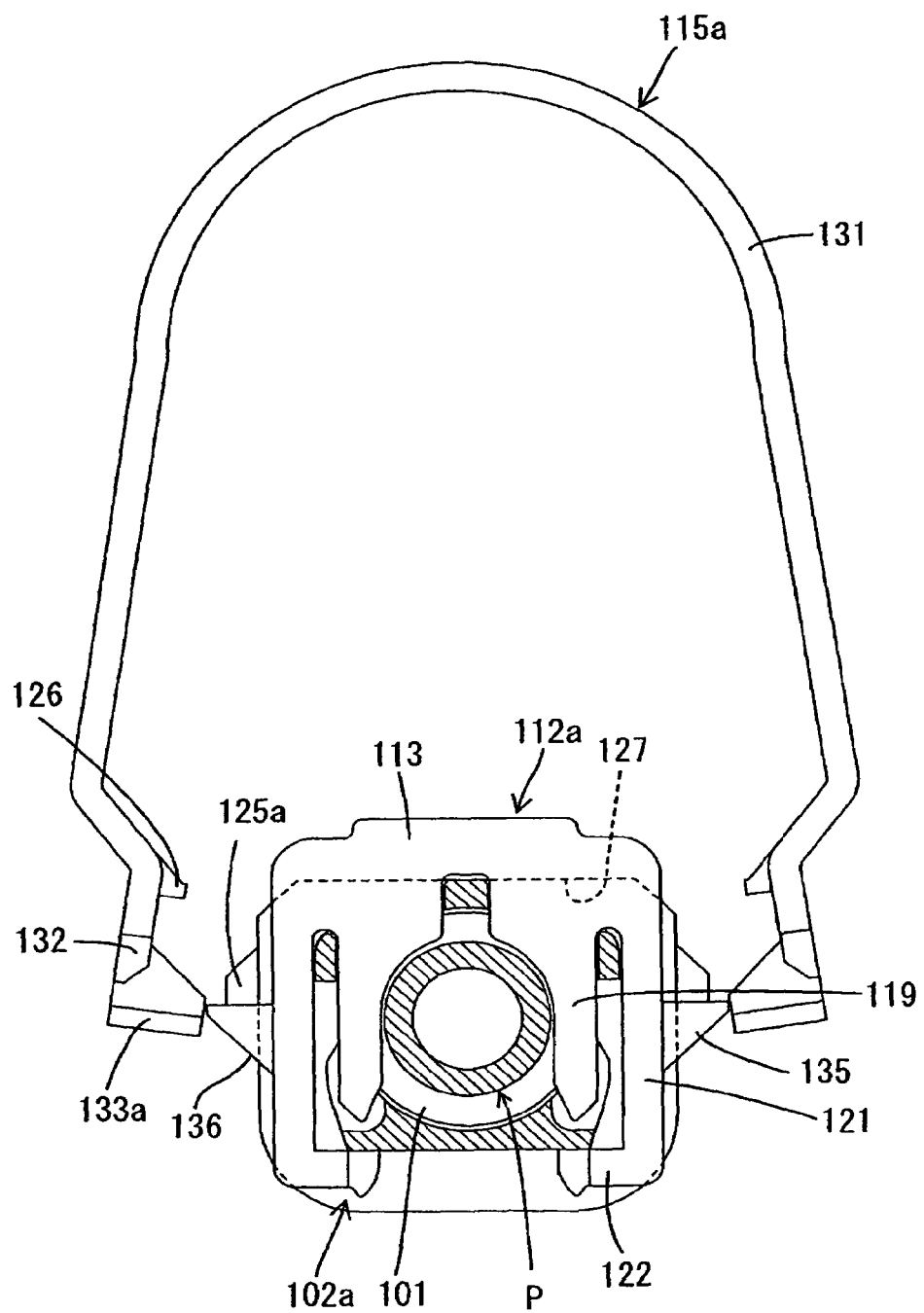
FIG. 34 is a sectional side view of the pipe joint under the condition where a position holding portion has been run onto an escape protrusion.
Figure 35:
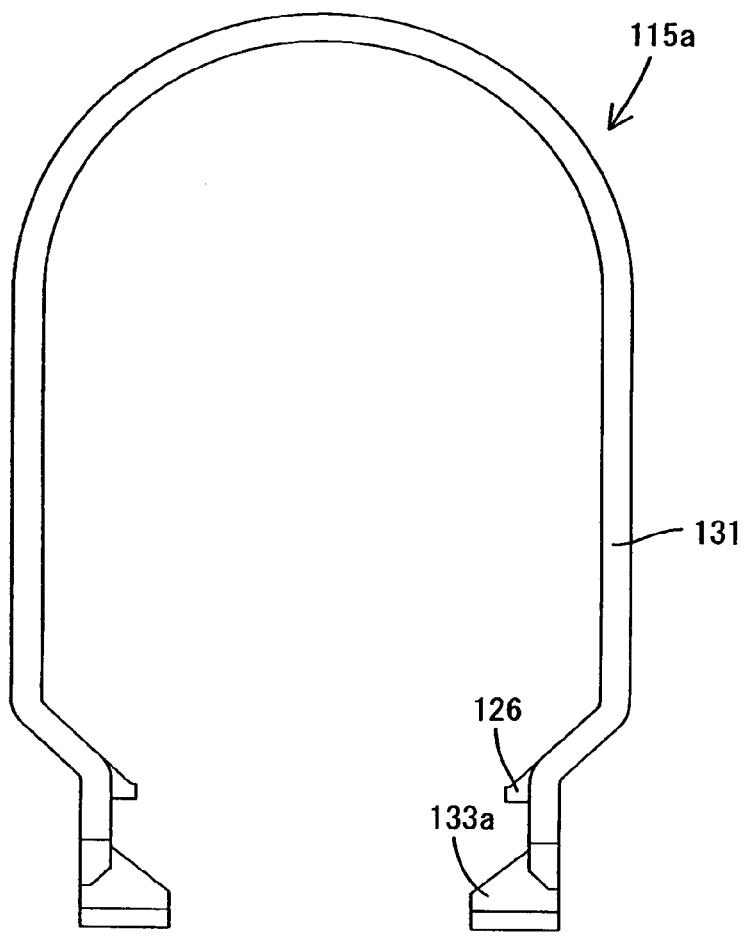
FIG. 35 is a sectional side view of the pipe joint under the condition where the checker has been pulled off the retainer.
Figure 35:
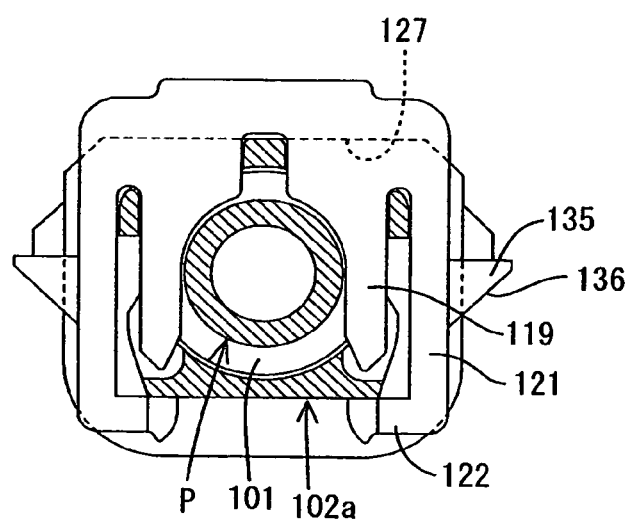
Figure 36:
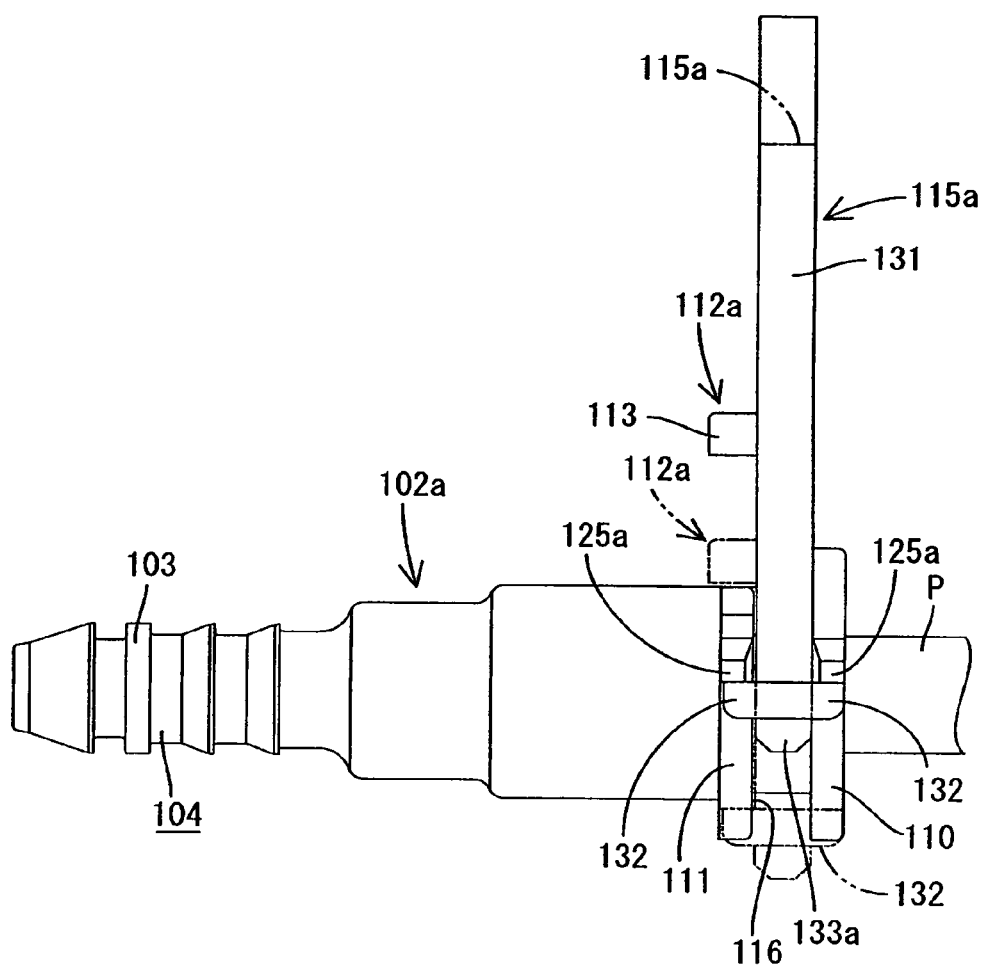
FIG. 36 is a front view of the pipe joint, showing the engagement of the hook and the engagement protrusion.

The operation and advantages of the pipe joint of the fifth embodiment will now be described. The rigid pipe P is initially inserted into the bore 105 after the retainer 112a has been located in the preliminary lock position. When the rigid pipe P reaches the insertion depth, the engagement arms 121 are spread apart such that the engagement claws 122 are disengaged from the stepped portions 123 (the state as shown in FIG. 32). In this condition, the operator presses the upper face of the base of the retainer 112a and forces the retainer 112a together with the checker 115a into the side of the pipe joint body 102a. The engagement claws 122 are then brought into sliding contact with the outer faces of the stepped portions 123. When the retainer 112a has reached the final locking position, the detecting piece 121 is resiliently restored towards the original configuration and the engagement claws 122 engage the underside of the pipe joint body 102a. In this case, the locking pieces 119 engage the rear face of the retaining flange 101 to prevent the pipe P from being inadvertently removed, as shown in FIG. 33. Further, when the retainer 112a is moved from the preliminary lock position to the final locking position, each escape protrusion 135 is moved from a position above the corresponding engagement protrusion 125a to a position where each escape protrusion 135 is located below the corresponding engagement protrusion 125a. In the second position, each escape protrusion 135 is located adjacent to a corresponding engagement protrusion 125a.

The operating piece 131 of the checker 115a is pulled once the retainer 112a has been moved to the final locking position. At this time, the removal preventing portions 132 are located below the engagement protrusions 125a and the engagement claws 122 of the retainer 112a are engaged with the underside of the pipe joint body 102a. Consequently, the pulling force can be applied directly to the connecting portions 126, whereupon the connecting portions 126 are severed and the checker 115a is removed upward while the retainer 112a is maintained at the final locking position. In this case, since the position holding portions 133a are brought into sliding contact with the inclined faces 136 of the escape protrusions 135, the position holding portions 133a slide over the escape protrusions 135 while gradually spreading apart both ends of the operating piece 131. As a result, the removal preventing portions 132 can reliably avoid re-engagement with the engagement protrusions 125a. Accordingly, the checker 115a can be smoothly removed.

However, in the fifth embodiment as well as the other embodiments, the retainer 112a cannot be moved from the preliminary lock position to the final locking position unless the rigid pipe P is inserted to the insertion depth. Since the removal preventing portions 132 are kept engaged with the engagement protrusions 125a, the pulling force is not directly applied to the connecting portions 126 of the checker 115a. Without a direct force upon the connecting portions 126, the connections with the retainer 112a are not severed. Therefore, since the checker 115a cannot be removed, the operator can determine that there is incomplete or inadequate insertion of the rigid pipe P. Additionally, when the retainer 112a is placed in the preliminary lock position, the position holding portions 133a are fitted deeply within the guide groove 116, whereupon the inclination of the checker 115a is inhibited. Due to the lack of inclining the checker 115a relative to the retainer 112a, the connecting portions 126 can be prevented from being inadvertently broken as in the fourth embodiment.

Figure 37:
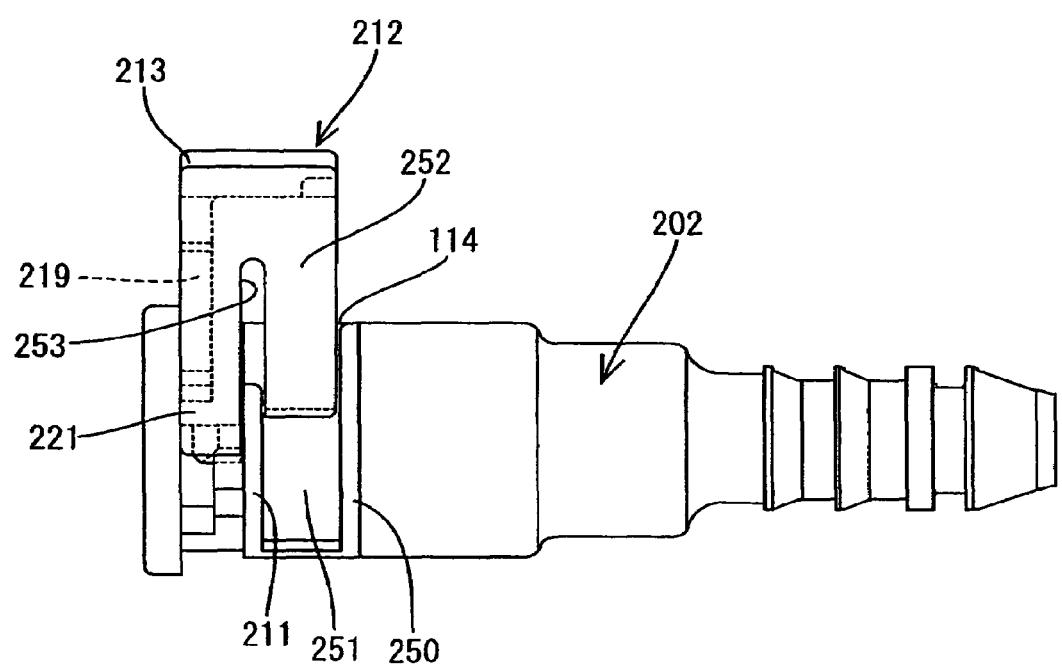
FIG. 37 is a side view of the pipe joint in the case where the retainer is at the preliminary lock position in the sixth embodiment of the invention.
Figure 38:
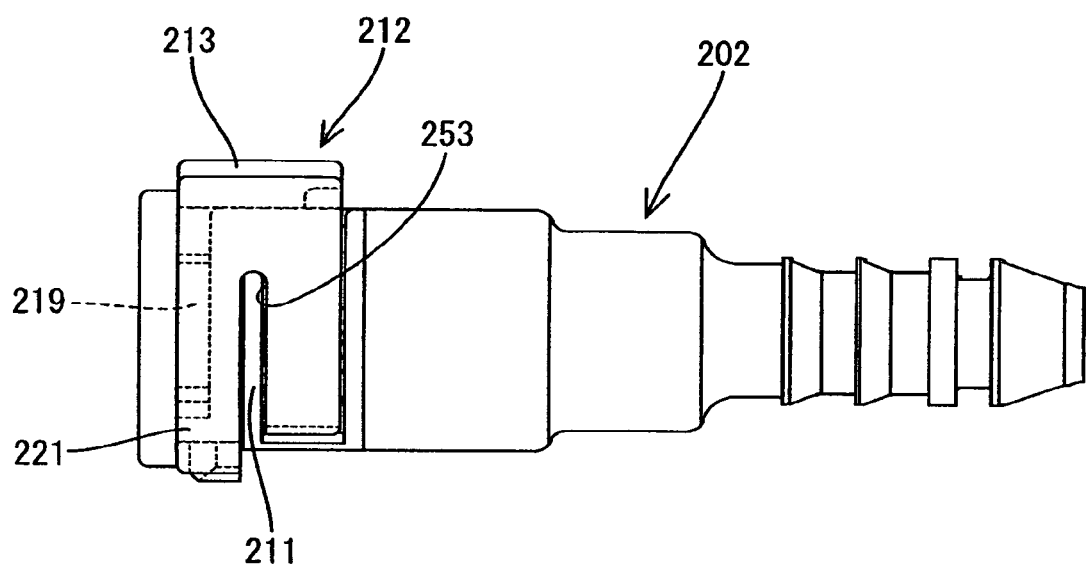
FIG. 38 is also a side view of the pipe joint in the case where the retainer is at the lock position.
Figure 39:
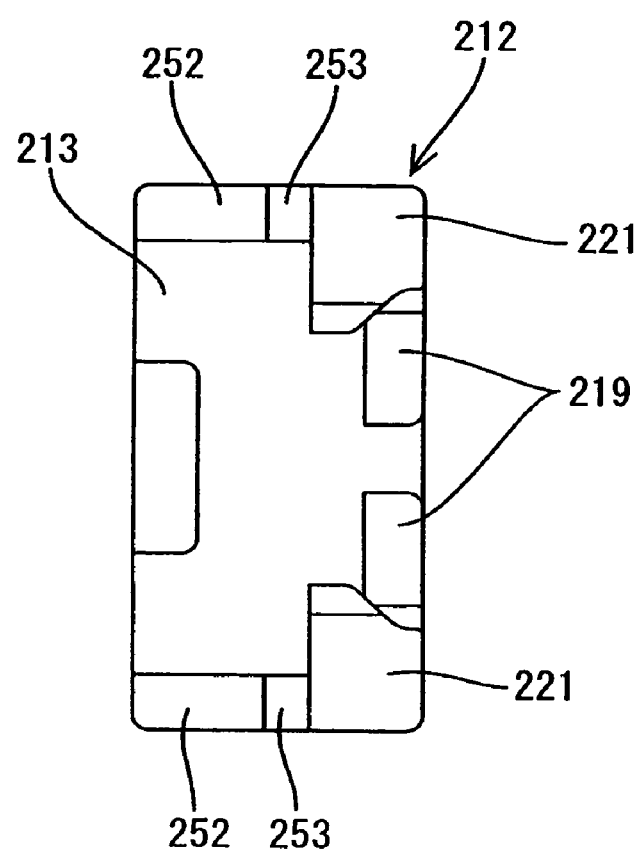
FIG. 39 is a bottom view of the retainer.

FIGS. 37 to 39 illustrate a sixth embodiment of the invention. The sixth embodiment differs from the fourth embodiment in that the pipe joint is provided without a checker, a pair of position holding pieces is added to the retainer, and guide grooves for the position holding pieces are provided in the sides of the pipe joint body. The sixth embodiment is basically the same as the fourth embodiment in all other respects. Accordingly, the identical or similar parts in the sixth embodiment are labeled by the same reference symbols as those in the fourth embodiment and the description of these parts may be eliminated. Consequently, primarily the differences between the sixth embodiment and the fourth embodiment will be described in the following.

The pipe joint body 202 is formed with a protruding edge 250 disposed in front of the protruding edge 211. The protruding edge 250 is formed in parallel with the protruding edge 211. A section between both protruding edges 211 and 250 serves as the guide recess 251. Each position holding piece 252 of the retainer 212 is adapted fit into the guide recess 251. When the retainer is placed in the preliminary lock position, the position holding pieces 252, fitted within the respective guide recesses 251, maintain the position of the retainer 212. When the retainer 212 is moved from the preliminary lock position to the final locking position, the respective guide recesses 251 guide the position holding pieces 252. The protruding edge 211 is lower than the protruding edge 250 and does not extend to the retainer attachment face 114 (see FIG. 37).

In addition to the engagement arms 221 and locking pieces 219, the position holding pieces 252 hang down from the lower face of the base 213 of the retainer 212. Each engagement arm 221 and each position holding piece 252 extends in parallel with one another. Slit 253 is interposed between each engagement arm 221 and each position holding piece 252. When the retainer 212 is in the preliminary lock position, each position holding piece 252 is fitted into an upper part of the guide recess 251 in order to prevent the overall retainer 212 from being inclined relative to the pipe joint body 202. When the retainer 212 is moved from the preliminary lock position to the final locking position, each protruding edge 211 enters the corresponding slit 253. Further, the distal end of each position holding piece 252 moves to the bottom of the guide recess 251 while both widthwise edges of each position holding piece 252 are in sliding contact with the protruding edge 211. The other construction of the pipe joint in the sixth embodiment is the same as the construction described in the fourth embodiment.

In the sixth embodiment, the position of the retainer 212 advancing from the preliminary lock position to the final locking position can be held in a normal way by the position holding pieces 252, in addition to the advantages of the fourth embodiment. Consequently, the assembly work can be carried out smoothly.

The present invention should not be limited to the foregoing embodiments. For example, the technical scope of the invention encompasses the following modified forms. The detecting piece is formed on the retainer in the fourth and fifth embodiments. However, the detecting piece may be provided at the checker side instead. Furthermore, the pipe joint body is of a straight type in the fourth, fifth, and sixth embodiments. The pipe joint body may instead be bent at 90° or at some other angle between the tube connector side and the pipe connector side.

Only a single pipe connector side and a single tube connector side are shown in the foregoing embodiments. The embodiments can be rearranged in ways not explicitly described to form new embodiments within the scope of the current invention. For example, a pipe joint for joining one rigid pipe connector to another rigid pipe may be within the technical scope. In addition, two or more tube connectors may be joined to a single rigid pipe connector as understood in the art.

A plurality of sliding contact faces are peripherally positioned around the edge of the support 81 to establish the various holding orientations of the tube connector relative to the locking direction of the retainer. Other systems and devices may be used in place of the sliding contact faces. For example, a series of protrusions and corresponding indentations formed on the opposing fitting faces of the support 81 and the mounting seat 63, or a series of radially oriented grooves interlocking one fitting face to another, may be used to hold the orientation of the tube connector relative to the locking direction of the retainer.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

This invention claims:

1. A pipe joint for connection to a rigid pipe that has a retaining flange at a distal end thereof, said pipe joint comprising:
   a pipe joint body formed with a bore extending axially therethrough including:
      a first end adapted to receive the rigid pipe in a direction of a center axis of the bore and having a space for passage of the retaining flange there through;
      a second end that is adapted to be connected to a flexible tube;
      a retaining window located in a retainer attachment face in communication with the bore;
      a first engagement window in communication with the bore and located in a first side of the pipe joint body approximately 90° clockwise away from the retainer attachment face around the center axis of the bore from a view of the pipe joint body;
      a first guide recess located on the first side of the pipe joint body;
      a second engagement window in communication with the bore and located in a second side of the pipe joint body approximately 90° counterclockwise away from the retainer attachment face around a center axis of the bore from the view of the pipe joint body along the insertion direction of the rigid pipe; and
      a second guide recess located on the second side of the pipe joint body;
   a pipe retainer comprising:
      a base;
      a locking piece extending from the base and inserted through the retaining window;
      a pair of engagement arms extending from the base along the first and second sides of the pipe joint body in the same direction as the locking piece, wherein each engagement arm comprises:
         a distal engagement claw inserted through a corresponding first engagement window or second engagement window;
         wherein the distal engagement claws are able to temporarily fix the pipe retainer in a preliminary lock position by engaging with the corresponding first engagement window and second engagement window so that the pipe retainer is prevented from movement toward a final lock position, thereby holding the pipe retainer at the preliminary lock position; and
      a pair of position holding arms extending from the base along the first and second sides of the pipe joint body in the same direction as the locking piece;
      wherein each of the pair of position holding arms slidably engages the corresponding first guide recess or second guide recess;
      wherein said pair of engagement arms are provided in a manner so that the engagement claws can be spread outward in response to the retaining flange of the rigid pipe pressing the engagement claws if the rigid pipe is inserted into the bore to release the pipe retainer from the preliminary lock position and allow the retainer to move to the final lock position; and
      wherein the locking piece is arranged in a manner so that when the rigid pipe is fully inserted, the locking piece can be moved to block the retaining flange to inhibit removal of the rigid pipe when the retainer is in the final lock position, said retainer being movable from said preliminary lock position, in which said preliminary lock position said distal engagement claws are engaged with the corresponding said first engagement window and said second engagement window and said locking piece is located outside said space through which the retaining flange passes, to said final lock position, in which said final lock position said locking piece extends through said retaining window into said space through which the retaining flange passes.

2. The pipe joint according to claim 1, wherein each of the first and the second guide recesses is at least partially defined by a first protrusion extending outward from the corresponding first side and second side of the pipe joint body; and
   wherein each of the first protrusions slidably interacts with a corresponding engagement arm and position holding arm so as to inhibit an altering of an orientation of the retainer as the retainer moves from the preliminary locking position to the final locking position.

3. The pipe joint according to claim 2, wherein each of the first side and the second side of the pipe joint body further comprises a second protrusion slidably interacting with a corresponding position holding arm so as to inhibit the altering of the orientation of the retainer as the retainer moves from the preliminary locking position to the final locking position.

4. The pipe joint according to claim 3, wherein each of the first and the second guide recesses is defined by a corresponding set of the first protrusion and the second protrusion.

5. The pipe joint according to claim 4, wherein each of the first protrusions has a shorter length than each of the second protrusions.

6. The pipe joint according to claim 5, wherein the second end of the pipe joint body is at an angle to the first end of the pipe joint body.

7. The pipe joint according to claim 1, wherein the second end of the pipe joint body is at an angle to the first end of the pipe joint body.

8. The pipe joint according to claim 1, wherein the locking piece further comprises:
   a first locking piece arm; and
   a second locking piece arm;
   wherein the first locking piece arm and the second locking piece arm are arranged and constructed to correspond to an outer circumference of the rigid pipe; and
   wherein when the retainer is in the final locking position, the first locking piece arm and the second locking piece arm abut the retainer flange, inhibiting the removal of the rigid pipe.

9. A pipe joint for connection to a rigid pipe that has a retaining flange at a distal end thereof, said pipe joint comprising:
   a pipe joint body formed with a bore extending axially therethrough including:
      a first end adapted to receive the rigid pipe in a direction of a center axis of the bore and having a space for passage of the retaining flange there through;
      a second end that is adapted to be connected to a flexible tube;
      two retaining windows located in a retainer attachment face in communication with the bore;
      a first engagement window in communication with the bore and located in a first side of the pipe joint body approximately 90° clockwise away from the retainer attachment face around the center axis of the bore from a view of the pipe joint body;
      a first guide recess located on the first side of the pipe joint body;

a second engagement window in communication with the bore and located in a second side of the pipe joint body approximately 90° counterclockwise away from the retainer attachment face around a center axis of the bore from the view of the pipe joint body along the insertion direction of the rigid pipe; and a second guide recess located on the second side of the pipe joint body; and a pipe retainer comprising:

a base;

a locking piece extending from the base and inserted through the retaining windows;

a pair of engagement arms extending from the base along the first and second sides of the pipe joint body in the same direction as the locking piece, wherein each engagement arm comprises:

a distal engagement claw inserted through a corresponding first engagement window or second engagement window;

wherein the distal engagement claws are able to temporarily fix the pipe retainer in a preliminary lock position by engaging with the corresponding first engagement window and second engagement window so that the pipe retainer is prevented from movement toward a final lock position, thereby holding the pipe retainer at the preliminary lock position; and a pair of position holding arms extending from the base along the first and second sides of the pipe joint body in the same direction as the locking piece;

wherein each of the pair of position holding arms slidably engages the corresponding first guide recess or second guide recess;

wherein said pair of engagement arms are provided in a manner so that the engagement claws can be spread outward in response to the retaining flange of the rigid pipe pressing the engagement claws if the rigid pipe is inserted into the bore to release the pipe retainer from the preliminary lock position and allow the retainer to move to the final lock position; and wherein the locking piece is arranged in a manner so that when the rigid pipe is fully inserted, the locking piece can be moved to block the retaining flange to inhibit removal of the rigid pipe when the retainer is in the final lock position, said retainer being movable from said preliminary lock position, in which said preliminary lock position said distal engagement claws are engaged with the corresponding said first engagement window and said second engagement window and said locking piece is located outside said space through which the retaining flange passes, to said final lock position, in which said final lock position said locking piece extends through said retaining windows into said space through which the retaining flange passes.

10. The pipe joint according to claim 9, wherein each of the first and the second guide recesses is partially defined by a first protrusion extending outward from the corresponding first side and second side of the pipe joint body and wherein each of the first protrusions slidably interacts with a corresponding engagement arm and position holding arm so as to inhibit an altering of an orientation of the retainer as the retainer moves from the preliminary locking position to the final locking position.

11. The pipe joint according to claim 10, wherein the second end of the pipe joint body is at an angle to the first end of the pipe joint body.

12. The pipe joint according to claim 11, wherein the retaining flange of the rigid pipe releases the retainer from the preliminary lock position by moving each of the distal engagement claws of the corresponding engagement arms outward away from the center axis of the bore, disengaging the distal engagement claws from the corresponding first engagement window and the second engagement window.

13. The pipe joint according to claim 9, wherein the pair of position holding arms is located further along the base in the insertion direction of the rigid pipe than the pair of engagement arms.

14. A pipe joint for connecting a rigid pipe having a retaining flange formed at a distal end thereof with a flexible tube, said pipe joint comprising:

a pipe joint body having a bore extending there through, said pipe joint body including:

a first end adapted to receive the rigid pipe therein and having a space for passage of the retaining flange there through;

a second end adapted to be connected to the flexible tube; and guide recesses located on sides of said pipe joint body;

a pipe retainer comprising:

a base;

a locking piece extending from said base; and engagement arms extending from said base around the sides of said pipe joint body, each of said engagement arms having an engagement claw positioned thereon and structured such that said pipe retainer is movable from a preliminary lock position, in which position said engagement claws extend through windows in said pipe joint body into a position in which said pipe retainer is prevented from moving radially toward a final lock position so as to hold said pipe retainer at the preliminary lock position, to the final lock position by pressing of said engagement claws by the radial flange of said rigid pipe when inserted into said pipe joint body so that said engagement claws are spread outward and by radial movement of said retainer; and a pair of position holding arms extending from said base along the sides of said pipe joint body in the same direction as said locking piece and engaging respective said guide recesses;

wherein said pipe joint body and said pipe retainer are structured so that when the rigid pipe is inserted into said pipe joint body so that the radial flange engages said engagement claws and said pipe retainer is moved to the final lock position, said locking piece moves to a position at which removal of the rigid pipe is blocked by said locking piece blocking the retaining flange, said retainer being moveable from said preliminary lock position, in which said preliminary lock position said distal engagement claws are engaged with the corresponding said windows and said locking piece is located outside said space through which the retaining flange passes, to said final lock position, in which said final lock position said locking piece extends through said retaining window into said space through which the retaining flange passes.

15. The pipe joint according to claim 14, wherein the guide recesses are at least partially defined by protrusions extending outward from sides of the pipe joint body; and wherein the protrusions slidably interact with a corresponding engagement arm and position holding arm so as to inhibit an altering of an orientation of the retainer as the retainer moves from the preliminary locking position to the final locking position.

16. The pipe joint according to claim 14, wherein the base includes a releasing depression.

17. The pipe joint according to claim 14, wherein the retaining flange of the rigid pipe releases the retainer from the preliminary lock position by moving each of the engagement claws of the corresponding engagement arms radially outward from a center axis of the bore, and disengaging the distal engagement claws from the windows.

18. The pipe joint according to claim 14, wherein the locking piece further comprises:

a first locking piece arm; and
a second locking piece arm;
wherein the first locking piece arm and the second locking piece arm are arranged and constructed to correspond to an outer circumference of the rigid pipe; and
wherein when the retainer is in the final locking position, the first locking piece arm and the second locking piece arm abut a retainer flange on said pipe joint body, inhibiting the removal of the rigid pipe.

* * * * *